US010784733B2

(12) United States Patent
Shimokawa et al.

(10) Patent No.: US 10,784,733 B2
(45) Date of Patent: Sep. 22, 2020

(54) MOTOR AND AIR CONDITIONING APPARATUS

(71) Applicant: Mitsubishi Electric Corporation, Tokyo (JP)

(72) Inventors: Takaya Shimokawa, Tokyo (JP); Koji Yabe, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 16/323,361

(22) PCT Filed: Oct. 5, 2016

(86) PCT No.: PCT/JP2016/079570
§ 371 (c)(1),
(2) Date: Feb. 5, 2019

(87) PCT Pub. No.: WO2018/066084
PCT Pub. Date: Apr. 12, 2018

(65) Prior Publication Data
US 2020/0021151 A1    Jan. 16, 2020

(51) Int. Cl.
H02K 1/27    (2006.01)
F24F 1/38    (2011.01)
(Continued)

(52) U.S. Cl.
CPC ............... H02K 1/278 (2013.01); F24F 1/38 (2013.01); H02K 1/146 (2013.01); H02K 1/30 (2013.01);
(Continued)

(58) Field of Classification Search
CPC ................................................. H02K 2201/03
(Continued)

(56) References Cited

U.S. PATENT DOCUMENTS 6,081,058 A * 6/2000 Suzuki ................. H02K 1/2786
310/156.45
6,784,582 B1 * 8/2004 Kolomeitsev ........ H02K 1/2733
310/156.01
(Continued)

FOREIGN PATENT DOCUMENTS

CN    203984139 U    12/2014
JP    H07-135758 A    5/1995
(Continued)

OTHER PUBLICATIONS

International Search Report of the International Searching Authority dated Dec. 20, 2016 for the corresponding International application No. PCT/JP2016/079570 (and English translation).
(Continued)

Primary Examiner — John K Kim
Assistant Examiner — Minki Chang
(74) Attorney, Agent, or Firm — Posz Law Group, PLC

(57) ABSTRACT

A motor includes a stator having a yoke having an annular shape about an axis line, and a first tooth and a second tooth extending from the yoke toward an inner or outer peripheral side, and a rotor rotatable about the axis line. The rotor has a permanent magnet on a surface facing the stator. Each of the first tooth and the second tooth includes an end portion facing the permanent magnet. The permanent magnet has a first magnetic pole and a second magnetic pole adjacent in a circumferential direction about the axis line, and a groove formed in an inter-pole portion between the first magnetic pole and the second magnetic pole. An interval L1 in the circumferential direction between the end portion of the first tooth and the end portion of the second tooth, and a width L2 of the groove satisfy $1.00 < L2/L1 \le 3.75$.

14 Claims, 17 Drawing Sheets

(51) Int. Cl.
*H02K 1/14* (2006.01)
*H02K 1/30* (2006.01)
*H02K 21/16* (2006.01)
*F24F 1/32* (2011.01)

(52) U.S. Cl.
CPC .............. *H02K 21/16* (2013.01); *F24F 1/32* (2013.01); *H02K 2201/03* (2013.01); *H02K 2213/03* (2013.01)

(58) Field of Classification Search
USPC ........................................................ 310/156
See application file for complete search history.

(56) References Cited

U.S. PATENT DOCUMENTS

| | | | | |
|---|---|---|---|---|
| 7,839,045 | B2* | 11/2010 | Wu | H02K 29/03 310/156.38 |
| 8,928,310 | B2* | 1/2015 | Ocket | G01D 5/2046 324/207.17 |
| 9,281,722 | B2* | 3/2016 | Moon | H02K 1/27 |
| 10,530,208 | B2* | 1/2020 | Buehler | H02K 1/2786 |
| 2005/0110356 | A1* | 5/2005 | Imamura | H02K 1/278 310/156.53 |
| 2006/0055266 | A1* | 3/2006 | Iwami | H02K 15/03 310/156.47 |
| 2008/0030095 | A1* | 2/2008 | Iizuka | H02K 23/04 310/156.43 |
| 2008/0218007 | A1 | 9/2008 | Masuzawa et al. | |
| 2012/0194024 | A1* | 8/2012 | Okada | H02K 29/08 310/156.01 |
| 2013/0026877 | A1* | 1/2013 | Matsuda | H02K 23/04 310/216.106 |
| 2013/0169099 | A1* | 7/2013 | Saban | H02K 1/278 310/156.12 |
| 2015/0115760 | A1* | 4/2015 | Tsuchiya | H02K 1/2713 310/156.49 |
| 2016/0254713 | A1* | 9/2016 | Yamaguchi | H02K 21/14 310/156.38 |
| 2018/0097413 | A1* | 4/2018 | Sun | H02K 1/2786 |

FOREIGN PATENT DOCUMENTS

| | | |
|---|---|---|
| JP | 2004-088855 A | 3/2004 |
| JP | 2004-088905 A | 3/2004 |
| JP | 2007-074888 A | 3/2007 |
| JP | 2011-066998 A | 3/2011 |
| JP | 2016-077093 A | 5/2016 |

OTHER PUBLICATIONS

Office Action dated May 6, 2020 issued in corresponding CN patent application No. 201680089231.1 (and English translation).

* cited by examiner

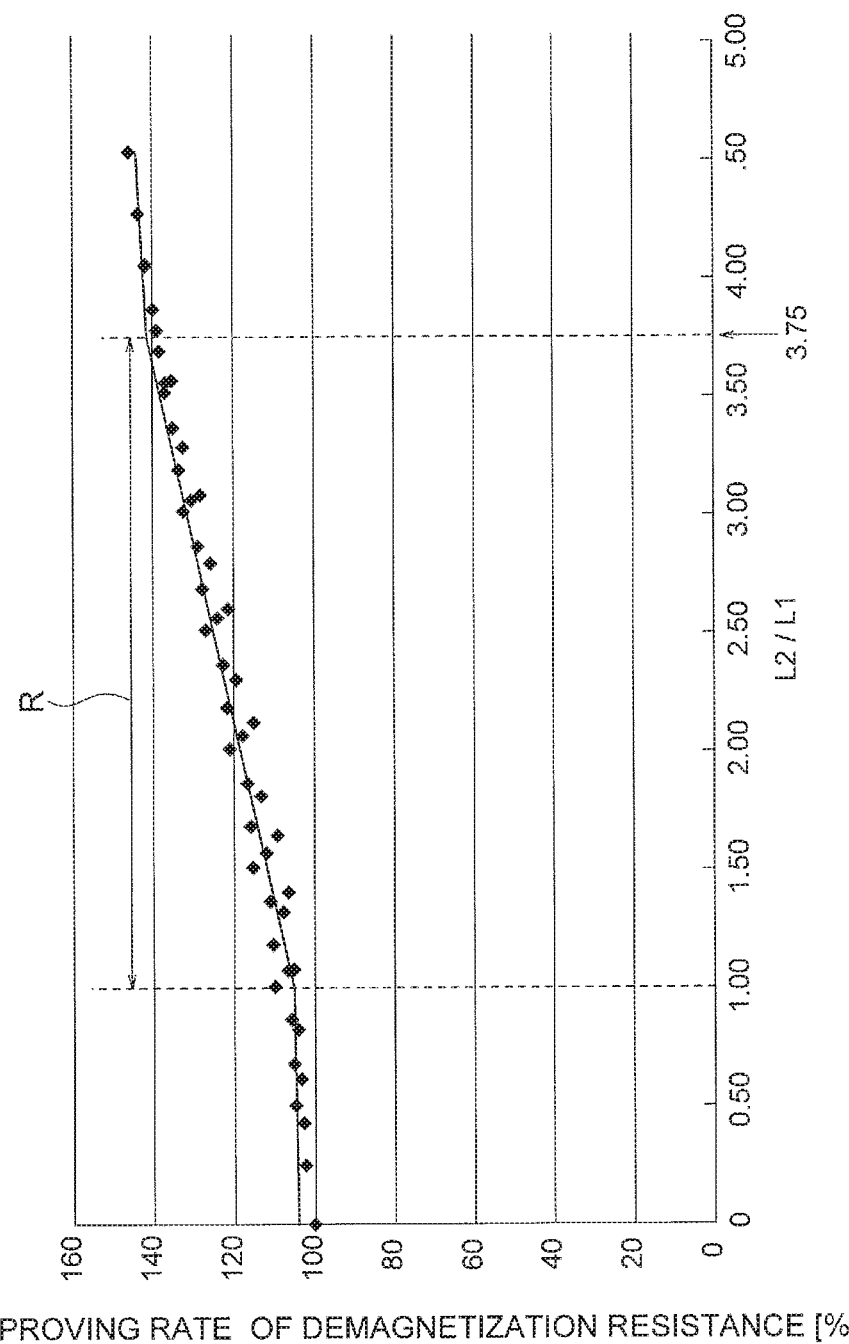

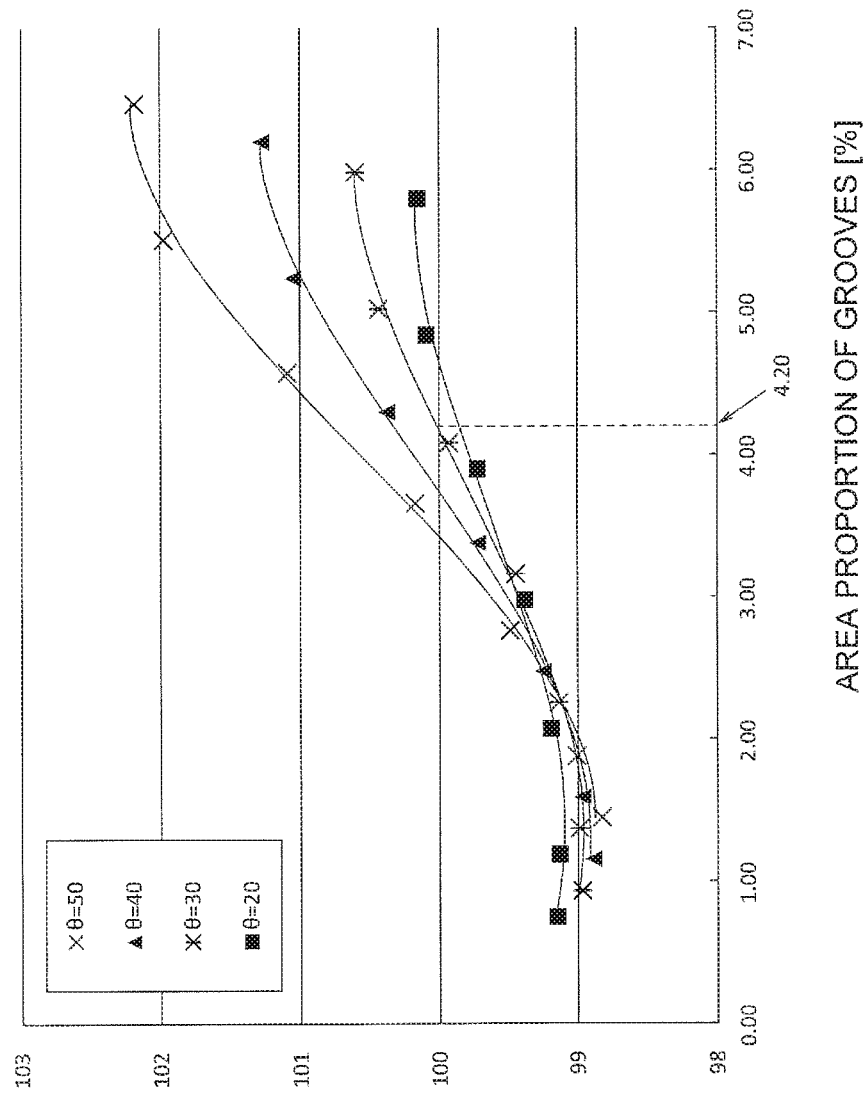

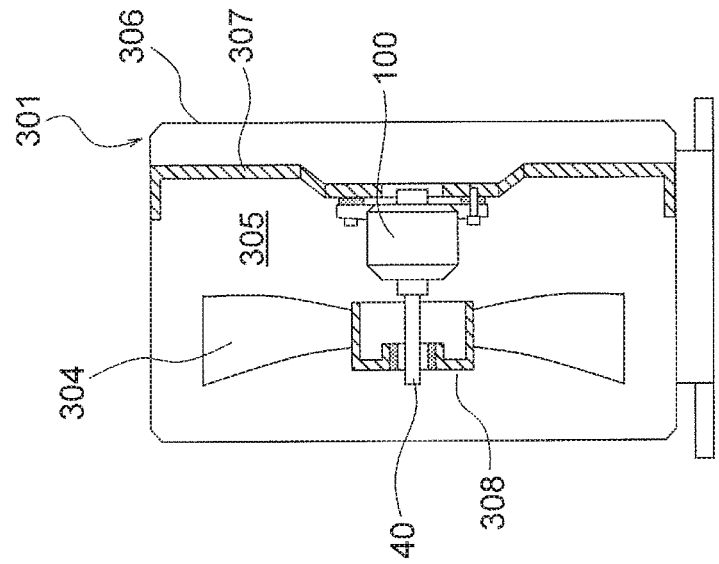
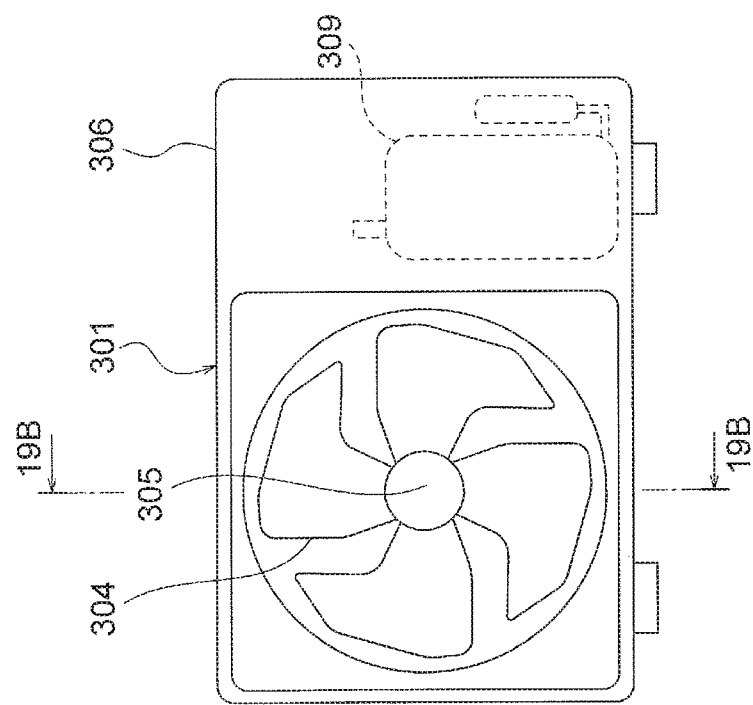

MOTOR AND AIR CONDITIONING APPARATUS

CROSS REFERENCE TO RELATED APPLICATION

This application is a U.S. national stage application of International Patent Application No. PCT/JP2016/079570 filed on Oct. 5, 2016, the disclosure of which is incorporated herein by reference.

TECHNICAL FIELD

The present invention relates to a motor, and an air conditioning apparatus using the motor.

BACKGROUND ART

Conventionally, a motor called an SPM (Surface Permanent Magnet) motor in which a permanent magnet is attached to a surface of a rotor is widely used. The permanent magnet has magnetic poles (north and south poles) alternately arranged in a circumferential direction of the rotor. Coils are wound around a stator, and magnetic flux generated by currents flowing through the coils also flows through a surface of the permanent magnet. The magnetic flux from the stator may cause demagnetization in an inter-pole portion between the adjacent magnetic poles of the permanent magnet.

For this reason, in order to suppress demagnetization, there is proposed a configuration in which grooves are formed in inter-pole portions of a permanent magnet attached to a rotor (see, for example, Patent Reference 1).

PATENT REFERENCE

Patent Reference 1: Japanese Patent Application Publication No. 2004-88855 (Abstract)

However, it is difficult to obtain a sufficient effect of suppressing demagnetization simply by forming grooves in the inter-pole portions of the permanent magnet.

SUMMARY

The present invention is made to solve the above described problem, and an object of the present invention is to effectively suppress demagnetization of a permanent magnet in a motor.

A motor according to the present invention includes a stator having a yoke having an annular shape about an axis line, and a first tooth and a second tooth extending from the yoke toward an inner peripheral side or an outer peripheral side, and a rotor rotatable about the axis line. The rotor has a permanent magnet on a surface facing the stator. Each of the first tooth and the second tooth has an end portion facing the permanent magnet. The permanent magnet has a first magnetic pole and a second magnetic pole adjacent to each other in a circumferential direction about the axis line, and a groove formed in an inter-pole portion between the first magnetic pole and the second magnetic pole. An interval L1 in the circumferential direction between the end portion of the first tooth and the end portion of the second tooth, and a width L2 of the groove in the circumferential direction satisfy $1.00 < L2/L1 \leq 3.75$.

According to the present invention, with a configuration in which the groove is formed in the inter-pole portion of the permanent magnet, and the interval L1 between the end portion of the first tooth and the end portion of the second tooth and the width L2 of the groove satisfy $1.00 < L2/L1 \leq 3.75$, a sufficient effect of suppressing demagnetization can be obtained.

BRIEF DESCRIPTION OF THE DRAWINGS

FIG. 6 is a graph illustrating a relationship between L2/L1 and an improving rate of demagnetization resistance.

FIG. 10 is a graph illustrating a relationship between the area proportion of the grooves and the improving rate of demagnetization resistance when an inclination of the groove side portion is changed.

FIGS. 19(A) and 19(B) are schematic diagrams illustrating a configuration of an outdoor unit of the air conditioning apparatus illustrated in FIG. 18.

DETAILED DESCRIPTION

First Embodiment (Configuration of Motor)

Figure 1:
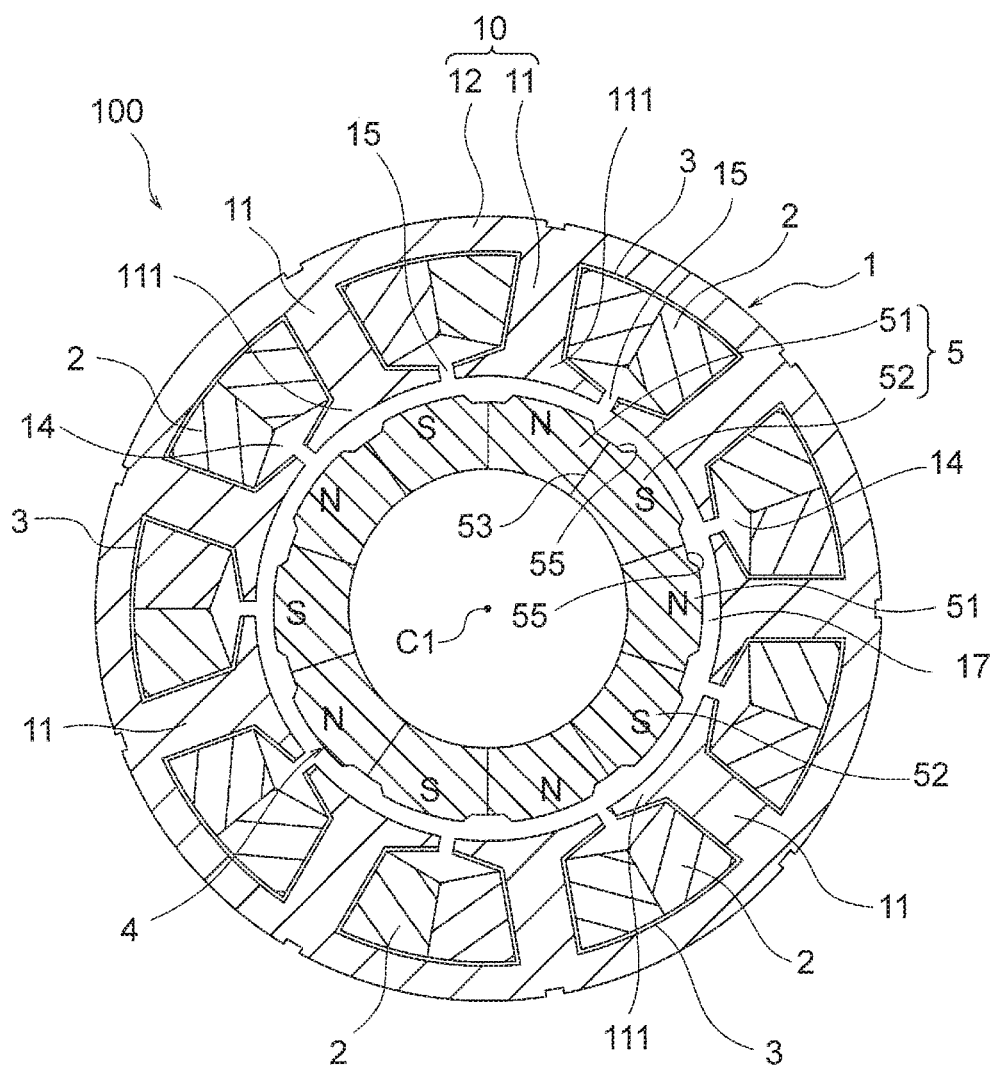
FIG. 1 is a sectional view illustrating a configuration of a motor according to the first embodiment.

FIG. 1 is a sectional view illustrating a motor 100 according to the first embodiment. The motor 100 is implemented as an inner-rotor type motor including an annular stator 1, and a rotor 4 rotatably disposed on an inner peripheral side of the stator 1. An air gap 17 of, for example, 0.5 mm is formed between the stator 1 and the rotor 4. The rotor 4 holds a permanent magnet 5 on its surface (outer peripheral surface). A motor holding a permanent magnet on a surface of a rotor in this manner is called an SPM motor.

Hereinafter, a center of rotation of the rotor 4 is defined as an axis line C1, and a direction of the axis line C1 will be referred to as an "axial direction". A direction along a circumference about the axis line C1 will be referred to as a "circumferential direction", and a radial direction about the axis line C1 will be referred to as a "radial direction".

The stator 1 includes a stator core 10, and coils 2 wound around the stator core 10. The stator core 10 is made by stacking a plurality of magnetic sheets each having a thickness of, for example, 0.2 mm to 0.5 mm in the axial direction and fastening the magnetic sheets together by crimping or the like. In this example, electromagnetic steel sheets containing iron (Fe) as a main ingredient are used as the magnetic sheets.

The stator core 10 includes a yoke 12 having an annular shape about the axis line C1, and a plurality of teeth 11 extending inward in the radial direction from the yoke 12. The teeth 11 are formed at equal intervals in the circumferential direction about the axis line C1. A slot 14 serving as a space to accommodate the coil 2 is formed between each adjacent two of the teeth 11. The number of the teeth 11 (that is, the number of the slots 14) is nine in this example, but it need only be two or more.

The coil 2 is formed of a material containing copper or aluminum as a main ingredient. The coil 2 may be wound around each of the teeth 11 (concentrated winding), or may be wound across a plurality of teeth 11 (distributed winding).

Figure 2:
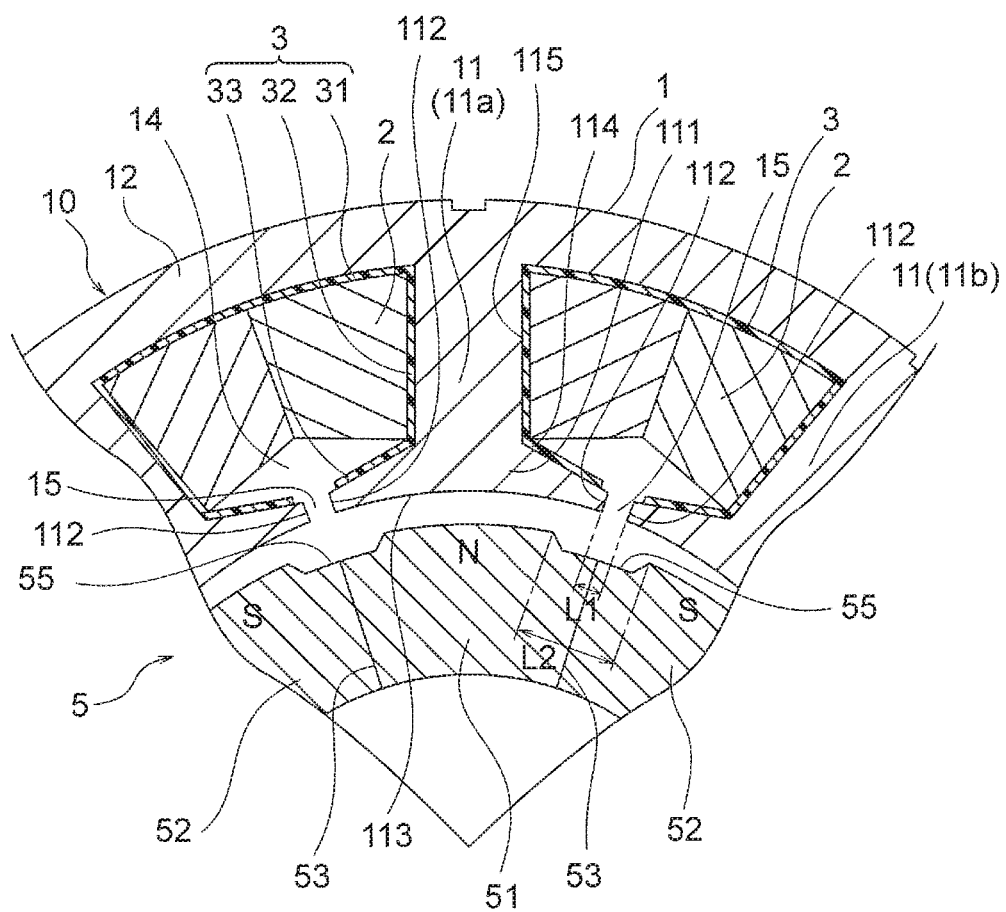
FIG. 2 is an enlarged sectional view illustrating a part of the motor according to the first embodiment.

FIG. 2 is an enlarged sectional view illustrating a part of the motor 100. The tooth 11 extends in the radial direction from the annular yoke 12 toward the axis line C1. The coil 2 is wound around side surfaces 115 (i.e., end surfaces in the circumferential direction and end surfaces in the axial direction) of the tooth 11. Further, the tooth 11 includes an end portion 111 formed at its end on an inner side in the radial direction, and the end portion 111 has a width in the circumferential direction wider than those of the other portions of the tooth 11.

An end surface 113 is formed at the end portion 111, and the end surface 113 faces the permanent magnet 5 (described later) of the rotor 4. Inclined surfaces 114 are formed on sides of the end portion 111 opposite to the end surface 113 of the end portion 111, and the inclined surfaces 114 face inside the slot 14. Further, ends 112 (also referred to as circumferential direction ends) are respectively formed at both ends of the end portion 111 in the circumferential direction.

An air gap 15 is formed between the end portions 111 of two adjacent teeth 11. The air gap 15 is also referred to as a slot opening. An interval between the end portions 111 of two adjacent teeth 11 (that is, an interval between two ends 112 facing each other) is expressed as an interval L1. The interval L1 can also be referred to as a width of the air gap 15.

For convenience in explanation, when freely-selected teeth 11 adjacent to each other in the circumferential direction are referred to as a first tooth 11a and a second tooth 11b, the interval L1 can be expressed as an interval between the end portion 111 of the first tooth 11a and the end portion 111 of the second tooth 11b. In this example, the tooth 11 in the center in FIG. 2 is referred to as the first tooth 11a, and its right side tooth 11 is referred to as the second tooth 11b, but the first tooth 11a and the second tooth 11b are not limited thereto. That is, the first tooth 11a and the second tooth 11b may be any combination of the teeth 11 adjacent to each other in the circumferential direction.

An insulator 3 (insulation part) is attached to the stator core 10. The insulator 3 is provided between the stator core 10 and the coil 2 and insulates the stator core 10 and the coil 2 from each other. The insulator 3 is formed by molding a resin integrally with the stator core 10 or fitting a resin molded body as a separate part to the stator core 10.

The insulator 3 is formed of a molded body of an insulating resin such as polybutylene terephthalate (PBT), polyphenylene sulfide (PBS), liquid crystal polymer (LCP), or polyethylene terephthalate (PET). The insulator 3 may also be formed of a resin film having a thickness of, for example, 0.035 mm to 0.4 mm.

The insulator 3 includes, for example, a first part 31 covering an inner peripheral surface of the yoke 12, a second part 32 covering the side surface 115 of the tooth 11, and a third part 33 covering the inclined surface 114 of the tooth 11. The first part 31, the second part 32, and the third part 33 are formed to surround the slot 14.

Figure 3:
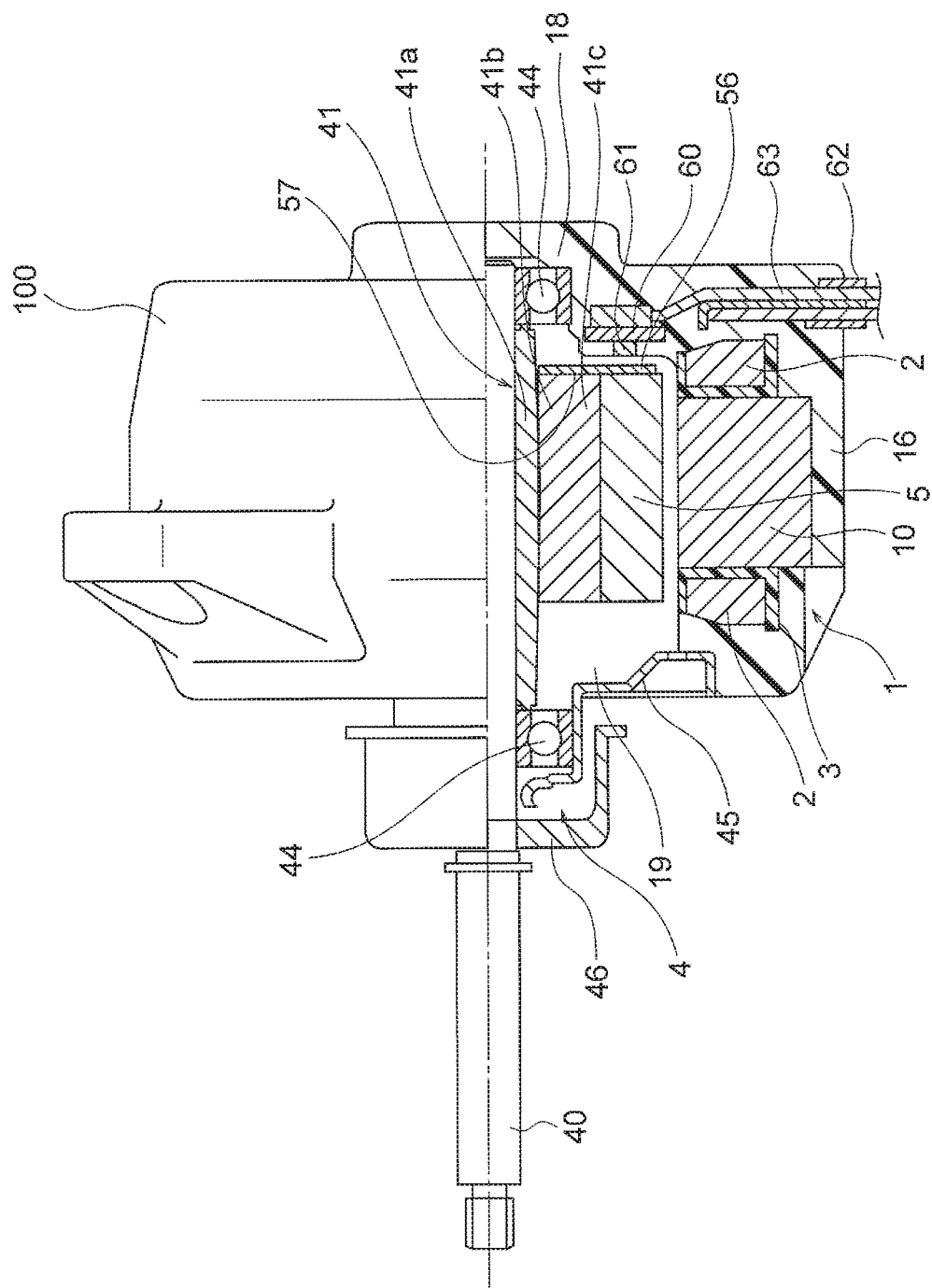
FIG. 3 is a partial side sectional view illustrating the configuration of the motor according to the first embodiment.
Figure 4:
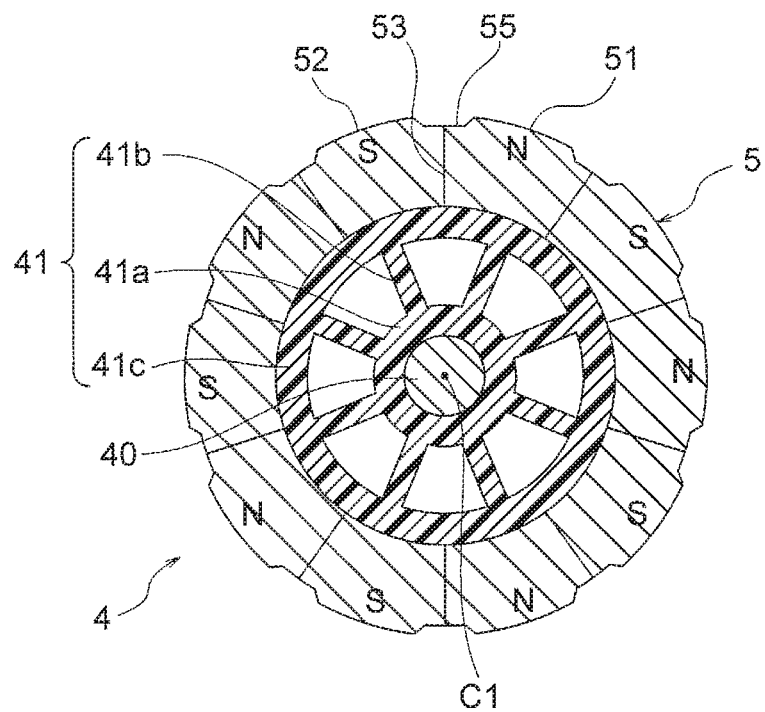
FIG. 4 is a sectional view illustrating a configuration of a rotor of the motor according to the first embodiment.

FIG. 3 is a partial sectional view illustrating a configuration of the motor 100. FIG. 4 is a sectional view illustrating a configuration of the rotor 4 of the motor 100. As illustrated in FIG. 3, the rotor 4 includes a shaft 40 serving as a rotation shaft, a resin part 41 formed integrally with the shaft 40, and the permanent magnet 5 mounted on the resin part 41. A central axis line of the shaft 40 coincides with the axis line C1 illustrated in FIG. 1. In this regard, in FIG. 1 described above, the permanent magnet 5 of the rotor 4 is illustrated but the resin part 41 is omitted.

The resin part 41 is formed of a thermoplastic resin such as PBT and molded integrally with the shaft 40. As shown in FIG. 4, the resin part 41 includes an inner cylindrical part 41a through which the shaft 40 penetrates in the axial direction, a plurality of ribs 41b radially extending from the inner cylindrical part 41a outward in the radial direction, and an outer cylindrical part 41c supported by the ribs 41b from an inner side in the radial direction. The outer cylindrical part 41c of the resin part 41 is an annular part about the axis line C1 and supports the permanent magnet 5.

The permanent magnet 5 has a configuration in which magnetic poles 51 (first magnetic poles) and magnetic poles 52 (second magnetic poles) are alternately arranged in the circumferential direction about the axis line C1. The magnetic poles 51 are magnetized so that their outer sides in the radial direction are north poles. The magnetic poles 52 are magnetized so that their outer sides in the radial direction are south poles. In the first embodiment, each of the magnetic poles 51 and 52 has anisotropy in the radial direction (radial anisotropy). The magnetic poles 51 and 52 are joined to each other. In this example, the permanent magnet 5 has ten poles, that is, five magnetic poles 51 and five magnetic poles 52, but the number of poles is not limited to ten.

As illustrated in FIG. 2, an inter-pole portion 53 is formed between adjacent magnetic poles 51 and 52 as a boundary between the magnetic poles. The permanent magnet 5 further includes a groove 55 on a surface (outer peripheral surface) of the permanent magnet 5 and in the inter-pole portion 53. The groove 55 is formed to suppress demagnetization in the inter-pole portion 53 caused by magnetic flux flowing from the teeth 11 into the permanent magnet 5, as will be described later. The groove 55 extends in the axial direction. A width of the groove 55 in the circumferential direction is expressed as a width L2.

The above described interval L1 between the end portions 111 of the adjacent teeth 11 and the width L2 of the groove 55 of the permanent magnet 5 satisfy $1.00 < L2/L1 \leq 3.75$. In other words, the width L2 of the groove 55 is larger than the interval L1 between the end portions 111 of the adjacent teeth 11, and is smaller than or equal to 3.75 times the interval L1. The reason will be described later.

The groove 55 has a shape in which a width decreases inward in the radial direction (i.e., decreases as a distance from the stator 1 increases). The above described width L2 of the groove 55 is a width (maximum width) at a position where the groove 55 is the widest, that is, at a surface of the permanent magnet 5.

The rotor 4 (including the permanent magnet 5) may be formed to be longer than the stator core 10 in the axial direction. With this arrangement, a length of the permanent magnet 5 in the axial direction longer is made longer, and accordingly a large magnetic force can be obtained. In this case, no groove 55 need be formed in a part of the permanent magnet 5 protruding outward in the axial direction from the stator core 10.

The permanent magnet 5 is formed of a magnet containing ferrite or a magnet containing a rare earth such as neodymium (Nd) or samarium (Sm). The permanent magnet 5 is desirably formed of a bonded magnet. The bonded magnet is formed by running a liquefied magnet into a mold and solidifying the magnet, and therefore the bonded magnet has a high degree of freedom in machining and is suitable for forming the grooves 55. The permanent magnet 5 may also be formed of a sintered magnet, but, in this case, the grooves 55 need be formed by cutting.

A resin core containing a mixture of a resin and an iron powder, or a soft magnetic material such as an electromagnetic steel sheet may be disposed between the permanent magnet 5 and the resin part 41, as a back yoke. The back yoke may be formed of a ferromagnetic material (for example, a ferrite magnet) having a magnetic force smaller than that of the permanent magnet 5 (for example, a rare-earth magnet). Alternatively, the back yoke may be disposed between the permanent magnet 5 and the shaft 40, without providing the resin part 41.

As illustrated in FIG. 3, a wiring board 60 is mounted at one end (the right end in FIG. 3) of the stator 1 in the axial direction. A lead wire group 63 including power supply lead wires, sensor lead wires and the like is connected to the wiring board 60. The lead wire group 63 is drawn outside the stator 1 via a lead wire outlet part 62. A current is supplied from the lead wire group 63 to the coils 2 via the wiring board 60.

A sensor magnet 56 is attached to one end (the right end in FIG. 3) of the rotor 4 in the axial direction. A magnetic sensor 61 attached to the wiring board 60 faces the sensor magnet 56. The magnetic sensor 61 is, for example, a Hall effect element.

When the rotor 4 rotates, a magnetic field flowing from the sensor magnet 56 into the magnetic sensor 61 changes, and the magnetic sensor 61 outputs a signal in response to a change in the magnetic field. The output of the magnetic sensor 61 is inputted to a control circuit provided in or outside the motor 100 via the sensor lead wires of the lead wire group 63. The control circuit detects a rotational position of the rotor 4 based on the signal outputted from the magnetic sensor 61.

The stator 1 is covered with a mold resin 16. The mold resin 16 is formed of, for example, a thermoplastic resin such as polybutylene terephthalate or polyphenylene sulfide. In the axial direction of the stator 1, an end part 18 on a side on which the wiring board 60 is mounted is covered with the mold resin 16, and an opening (rotor insertion hole) 19 is formed at an end opposite to the end part 18.

The rotor 4 including the permanent magnet 5 is inserted inside the stator 1 through the opening 19 and faces the inner peripheral ends (the end surfaces 113 illustrated in FIG. 2) of the teeth 11 of the stator 1. The shaft 40 of the rotor 4 is supported by a pair of bearings 44. One of the bearings 44 is held by the mold resin 16 at the end part 18 of the stator 1. The other of the bearings 44 is held by a bracket 45 disposed in the opening 19 of the stator 1.

The configuration of the motor 100 illustrated in FIG. 3 is merely an example. For example, the stator 1 may be fixed inside a shell containing iron as a main ingredient by shrink fitting or the like, without using the mold resin 16. Further, a configuration in which neither the sensor magnet 56 nor the magnetic sensor 61 is provided is also possible.

In the above configured motor 100, when a current flows through the coil 2 of the stator 1, the magnetic poles 51 and 52 of the permanent magnet 5 of the rotor 4 and a magnetic field generated by the current flowing through the coil 2 of the stator 1 repeatedly attract and repel each other, and accordingly the rotor 4 rotates.

(Configuration for Suppressing Demagnetization of Permanent Magnet)

Figure 5:
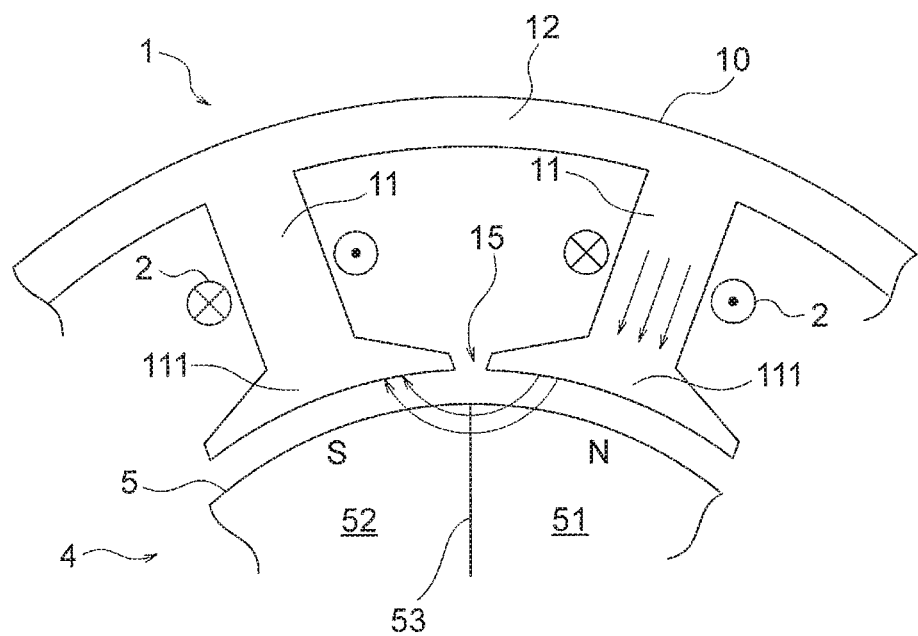
FIG. 5 is a schematic diagram for explaining magnetic flux flowing from a stator into the rotor.

FIG. 5 is a schematic diagram for explaining flow of magnetic flux generated by the current in the coil 2. In this regard, the grooves 55 are not formed in the permanent magnet 5 in FIG. 5. The magnetic flux generated by the current in the coil 2 wound around the tooth 11 passes through a surface portion of the permanent magnet 5 facing the end portion 111 of the tooth 11 and flows into the adjacent tooth 11.

A larger amount of magnetic flux flowing through a portion of the rotor 4 as the portion is closer to the teeth 11. Further, as the interval between the end portions 111 of the adjacent teeth 11 decreases, an amount of magnetic flux flowing through the surface portion of the permanent magnet 5 increases (that is, a strong magnetic field acts thereon).

When a magnetic field in the direction opposite to a magnetization direction (referred to as a reverse magnetic field) acts on the permanent magnet 5, anisotropy of the permanent magnet 5 is disturbed and demagnetization may occur. In particular, the inter-pole portion 53 between the magnetic pole 51 and the magnetic pole 52 has a low permeance coefficient and is therefore prone to demagnetization.

For this reason, in the first embodiment, demagnetization of the permanent magnet 5 is suppressed by forming the grooves 55 on the surface of the permanent magnet 5 and in the inter-pole portions 53 (that is, portions most prone to demagnetization in the permanent magnet 5), as illustrated in FIG. 2.

The width L2 of the groove 55 is larger than the interval L1 between the end portions 111 of adjacent teeth 11. In other words, an area in which the groove 55 is formed includes the inter-pole portion 53 of the permanent magnet 5 and a particularly large amount of magnetic flux from the tooth 11 interlinks with the area. With this configuration, portions of the permanent magnet 5 on which a strong reverse magnetic field acts are reduced, and effect of suppressing demagnetization is enhanced.

FIG. 6 is a graph illustrating a relationship between L2/L1 and an improving rate of demagnetization resistance. A vertical axis represents the improving rate of demagnetization resistance, and a horizontal axis represents L2/L1. The improving rate of demagnetization resistance is calculated from a current value in the coil 2 when demagnetization of the permanent magnet 5 occurs. The current value in the coil 2 when demagnetization of the permanent magnet 5 having no groove 55 (L2/L1=0) occurs is set to 100%.

The reason of using the ratio L2/L1 is as follows. In the permanent magnet 5, an area into which the magnetic flux flows from the tooth 11 is determined by the interval L1 between the end portions 111 of the adjacent teeth 11. The width L2 of the groove 55 is determined so as to suppress demagnetization caused by the magnetic flux from the tooth 11. Therefore, it is most desirable to evaluate the width L2 of the groove 55 of the permanent magnet 5 using the ratio (L2/L1) of the width L2 to the interval L1 between the end portions 111 of the teeth 11. In this example, the width L2 of the groove 55 is changed while the interval L1 between the end portions 111 of the adjacent teeth 11 is a fixed value.

As illustrated in FIG. 6, as L2/L1 increases, the improving rate of demagnetization resistance remains at the same level until L2/L1 exceeds 1.00, but the improving rate of demagnetization resistance starts increasing when L2/L1 exceeds 1.00. Further, when L2/L1 exceeds 3.75, the increase in the improving rate of demagnetization resistance becomes moderate (that is, a gradient becomes moderate).

More specifically, as indicated by an arrow R in FIG. 6, it is understood that demagnetization can be most effectively suppressed when L2/L1 is larger than 1.00 and smaller than or equal to 3.75. In other words, it is understood that a range expressed as 1.00<L2/L1≤3.75 is a range in which demagnetization can be most effectively suppressed.

Figure 7A:
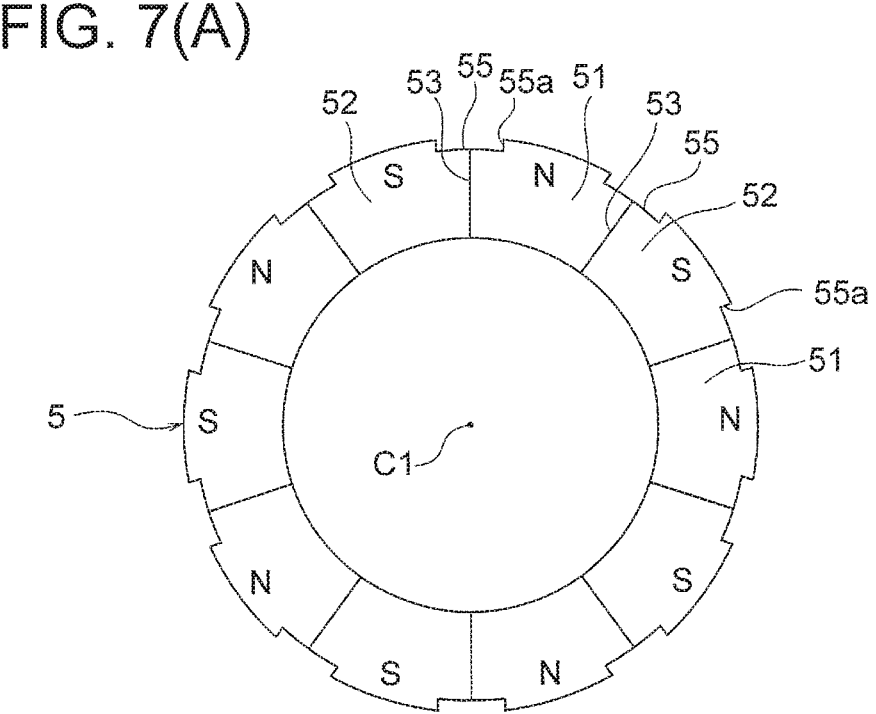
FIGS. 7(A) and 7(B) are schematic diagrams illustrating a first example and a second example of a groove shape.
Figure 7B:
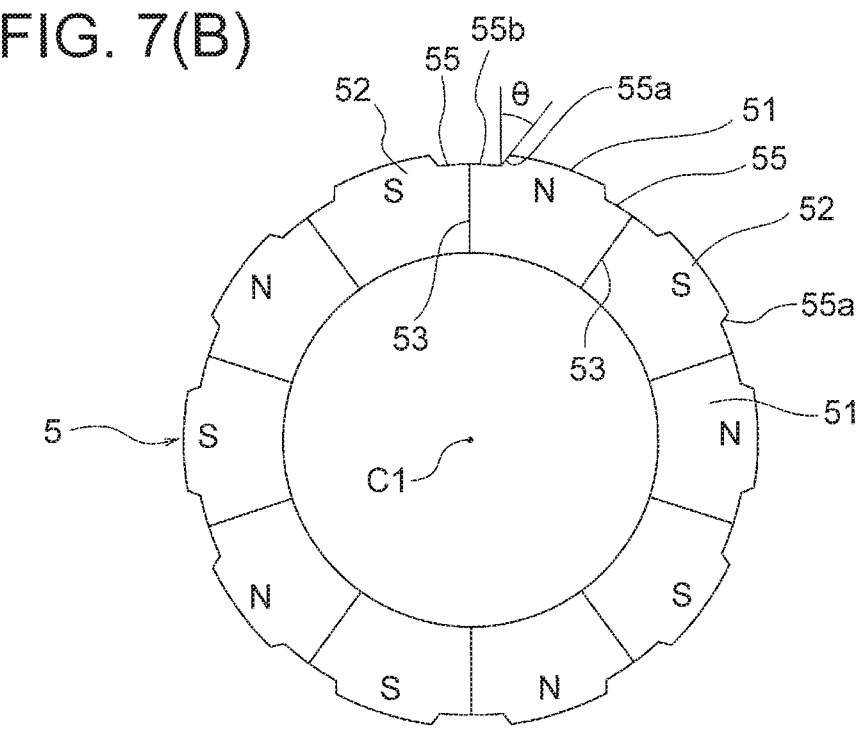

Next, a shape of the groove 55 will be described. FIGS. 7(A) and 7(B) are schematic diagrams for explaining examples of the shape of the groove 55. In the example illustrated in FIG. 7(A), the width of the groove 55 is constant in the radial direction of the rotor 4. That is, the width of the groove 55 is the same on an outer side and on an inner side in the radial direction. In contrast, in the example illustrated in FIG. 7(B), the width of the groove 55 decreases inward in the radial direction of the rotor 4. More specifically, the groove 55 illustrated in FIG. 7(B) includes a groove bottom 55b extending in the circumferential direction, and groove side portions 55a (groove walls) on both sides of the groove bottom 55b in the circumferential direction, and the groove side portions 55a are inclined surfaces.

As illustrated in FIG. 7(A), when the width of the groove 55 is the same on the outer side and on the inner side in the radial direction of the rotor 4, an effect of suppressing demagnetization is obtained. However, a proportion of an area of the grooves 55 to an area (cross sectional area) of the permanent magnet 5 (referred to as an area proportion of the grooves 55 hereinafter) in a cross section perpendicular to the axis line C1 increases, and therefore the magnetic flux generated by the permanent magnet 5 decreases. In other words, a magnetic force of the permanent magnet 5 decreases. Therefore, a torque may decrease, and a motor efficiency may be reduced.

In contrast, as illustrated in FIG. 7(B), when the width of the groove 55 is wider on the outer side of the rotor 4 in the radial direction and narrower on the inner side of the rotor 4 in the radial direction, demagnetization can be efficiently suppressed since the amount of magnetic flux flowing from the teeth 11 into the permanent magnet 5 is larger on the outer side of the rotor 4 in the radial direction. In addition, the area proportion of the grooves 55 can be reduced by narrowing the width of the groove 55 on the inner side of the rotor 4 in the radial direction. As a result, a decrease in magnetic flux generated by the permanent magnet 5 can be suppressed. The torque is proportional to a product of the magnetic flux of the rotor 4 and the current flowing through the coil 2. Thus, as the decrease in magnetic flux generated by the permanent magnet 5 is suppressed, the current required to output a given torque decreases. Therefore, magnetic flux flowing from the teeth 11 into the permanent magnet 5 decreases, and demagnetization is more unlikely to occur.

Figure 8:
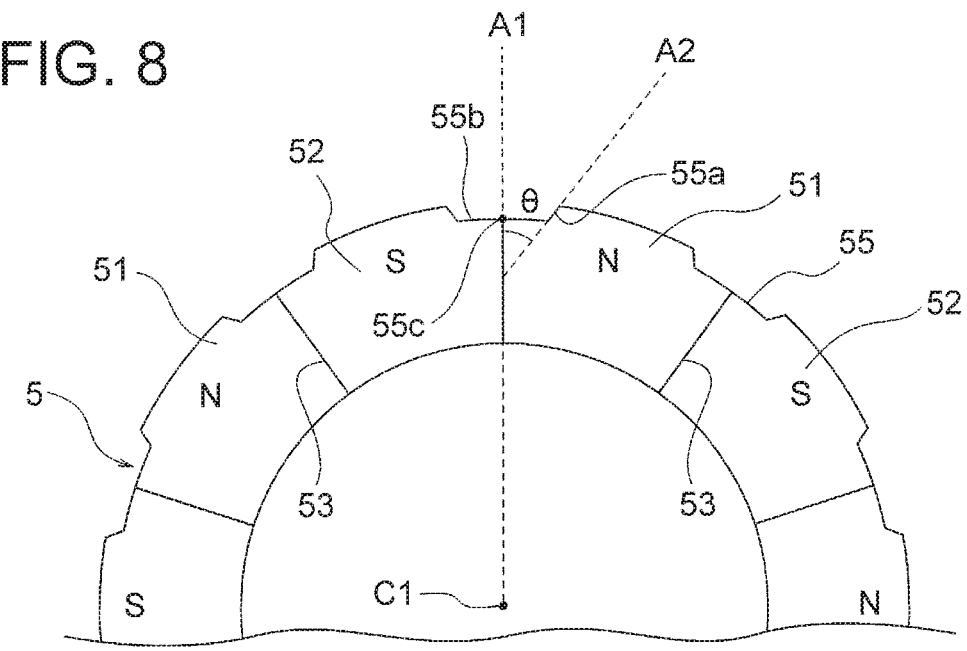
FIG. 8 is a schematic diagram for explaining an inclination angle of a groove side portion.

FIG. 8 is a schematic diagram for explaining a definition of an angle of the groove side portion 55a of the groove 55. As illustrated in FIG. 8, in a plane perpendicular to the axis line C1, a straight line A1 passing through the axis line C1 and a central point 55c in the circumferential direction of the groove bottom 55b of the groove 55 is defined. An angle between the groove side portion 55a and the straight line A1 is defined as an angle θ.

Figure 9:
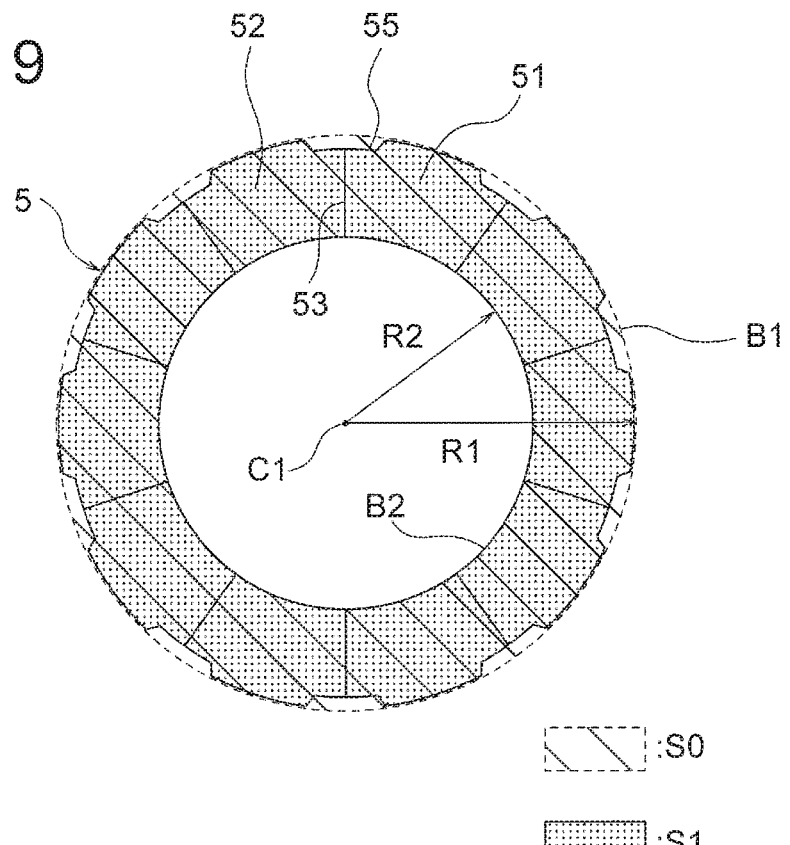
FIG. 9 is a schematic diagram for explaining a method for calculating an area proportion of grooves.

FIG. 9 is a schematic diagram for explaining a method for calculating the area proportion of the grooves 55 (the proportion of the area of the grooves 55 to the area of the permanent magnet 5 in a cross section perpendicular to the axis line C1). As illustrated in FIG. 9, the area of the permanent magnet 5 in a cross section perpendicular to the axis line C1 is defined as an area S1. A distance from the axis line C1 to a circle B1 touching an outer periphery of the permanent magnet 5 is expressed as R1, and a distance from the axis line C1 to a circle B2 touching an inner periphery of the permanent magnet 5 is expressed as R2. An area S0 obtained by subtracting an area of the circle B2 having the radius R2 from an area of the circle B1 having the radius R1 corresponds to the area of an annular part surrounded by the two circles B1 and B2.

The area of the grooves 55 (more specifically, the area in a cross section perpendicular to the axis line C1) is a value (S0−S1) obtained by subtracting the area S1 from the area S0. Therefore, the ratio (%) of the area of the grooves 55 to the area of the permanent magnet 5, that is, the area proportion of the grooves 55 is expressed as (S0−S1)/S1× 100.

FIG. 10 is a graph illustrating a relationship between the area proportion of the grooves 55 and the improving rate of demagnetization resistance when the angle θ of the groove side portion 55a is changed to 20°, 30°, 40°, and 50°. A vertical axis represents the improving rate of demagnetization resistance. The improving rate of demagnetization resistance is calculated from the current value in the coil 2 when demagnetization occurs. The current value in the coil 2 when demagnetization occurs in a case where θ is 0 (FIG. 7(A)) is set to 100%. A horizontal axis represents the area proportion of the grooves 55.

As illustrated in FIG. 10, the demagnetization resistance tends improve as the area proportion of the grooves 55 increases and the angle θ increase. When the area proportion of the grooves 55 ((S0−S1)/S1×100) is larger than 4.20% and the angle θ of the groove side portion 55a is larger than or equal to 30°, the improving rate of demagnetization resistance is higher than or equal to 100%, and it is understood that an effect of improving demagnetization resistance is obtained.

From this result, it is understood that the effect of suppressing demagnetization of the permanent magnet 5 can be enhanced when the area S1 of the permanent magnet 5 and the area S0 of the annular part surrounded by the circle B1 touching the outer periphery of the permanent magnet 5 and the circle B2 touching the inner periphery of the permanent magnet 5 satisfy (S0−S1)/S1×100>4.20% and the angle θ is 30° or larger.

Figure 11A:
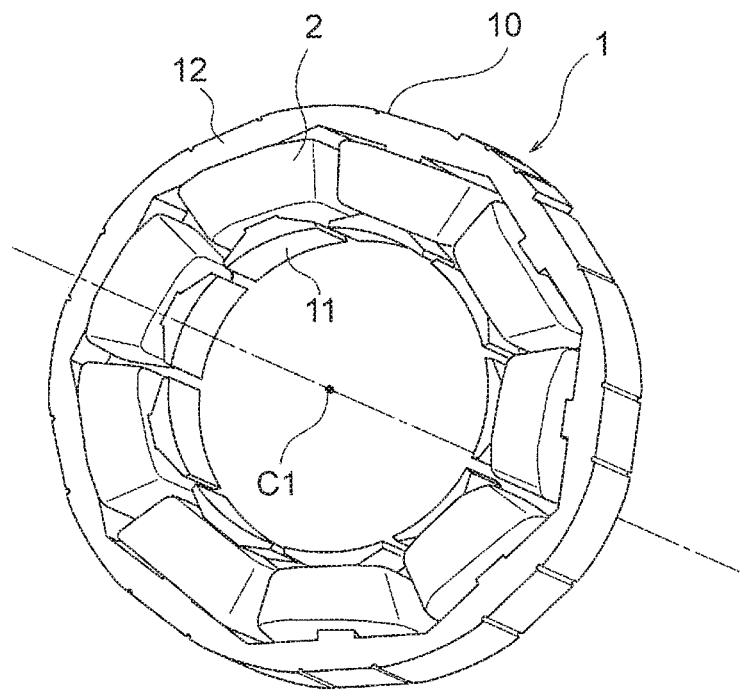
FIG. 11(A) is a perspective view illustrating a shape of the stator.
Figure 11B:
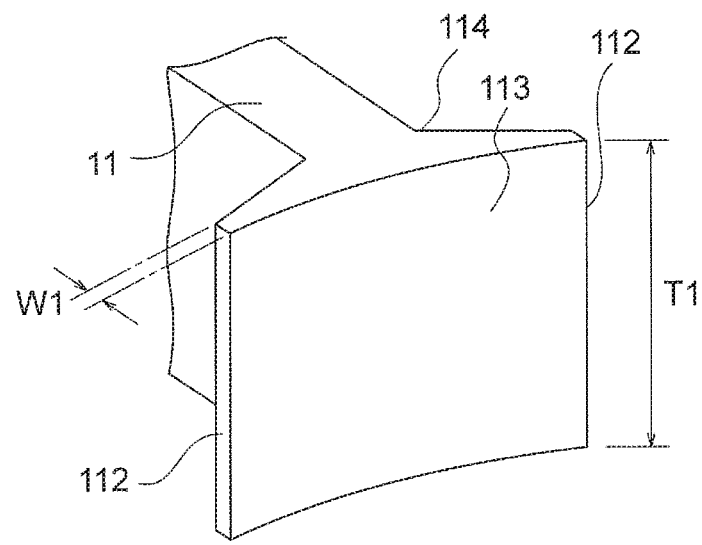
FIG. 11(B) is an enlarged view illustrating an end portion of a tooth.

Next, a shape of the end portion 111 of the tooth 11 will be described. FIG. 11(A) is a perspective view illustrating an external shape of the stator 1. FIG. 11(B) is a perspective view illustrating the shape of the end portion 111 of the tooth 11. The end portion 111 of the tooth 11 has a shape in which a length (width) in the radial direction decreases toward either end 112 in the circumferential direction.

Each end 112 of the end portion 111 of the tooth 11 has a rectangular end surface facing the above described air gap 15. When a length (width) of the end 112 in the radial direction is expressed as W1 and a length of the tooth 11 in the axial direction is expressed as T1, the area of the end 112 is expressed as W1×T1.

The magnetic flux generated by the current flowing through the coil 2 wound around the tooth 11 is expressed as Φ. The stator core 10 (the teeth 11 and the yoke 12) is made of electromagnetic steel sheets containing iron as a main ingredient. When the magnetic flux density exceeds 1.6 T, the electromagnetic steel sheets reach magnetic saturation, magnetic permeability decreases, and thus the magnetic resistance increases. The magnetic flux generated by the current in the coil 2 passes through the end 112 of the tooth 11 and flows into the adjacent tooth 11 through the air gap 15, as described above.

The magnetic flux density at the end 112 of the tooth 11 is expressed as $\Phi/(W1 \times T1)$. Accordingly, a configuration satisfying $\Phi/(W1 \times T1) > 1.6$ (T) increases the magnetic resistance when the magnetic flux passes through the end 112 of the tooth 11. As a result, the magnetic flux flowing from the tooth 11 into the permanent magnet 5 can be reduced, and the effect of suppressing demagnetization of the permanent magnet 5 can be further enhanced.

Effects of Embodiment

As described above, in the first embodiment of the present invention, the groove 55 is formed on the surface of the permanent magnet 5 and in the inter-pole portion 53, and the width L2 of the groove 55 and the interval L1 between the end portions 111 of the adjacent teeth 11 satisfy $1.00 < L2/L1 \leq 3.75$. Therefore, demagnetization of the permanent magnet 5 due to magnetic flux flowing from the teeth 11 into the permanent magnet 5 can be effectively suppressed.

Further, since the groove 55 of the permanent magnet 5 has a shape in which a width decreases inward in the radial direction, the effect of suppressing demagnetization can be obtained, and the reduction in area of the permanent magnet 5 in a cross section perpendicular to the axis line C1 can be suppressed. In other words, the decrease in magnetic flux generated by the permanent magnet 5 can be suppressed, and the reduction in motor efficiency can be suppressed.

Further, with a configuration in which the area S1 of the permanent magnet 5 and the area S0 of the annular portion surrounded by the circle B1 touching the outer periphery of the permanent magnet 5 and the circle B2 touching the inner periphery of the permanent magnet 5 satisfy $(S0-S1)/S1 \times 100 > 4.20\%$, and the angle θ of the groove side portion 55a is 30° or larger, the effect of suppressing demagnetization of the permanent magnet 5 can be enhanced.

Further, with a configuration in which the length W1 in the radial direction of the end 112 of the tooth 11 in the circumferential direction, the length T1 of the tooth 11 in the axial direction, and the magnetic flux Φ generated in the tooth 11 satisfy $\Phi/(W1 \times T1) > 1.6$ (T), the magnetic resistance when the magnetic flux passes through the end 112 of the tooth 11 can be increased. As a result, the magnetic flux flowing from the teeth 11 into the permanent magnet 5 decreases, and the effect of suppressing demagnetization of the permanent magnet 5 can be further enhanced.

Modification

Figure 12:
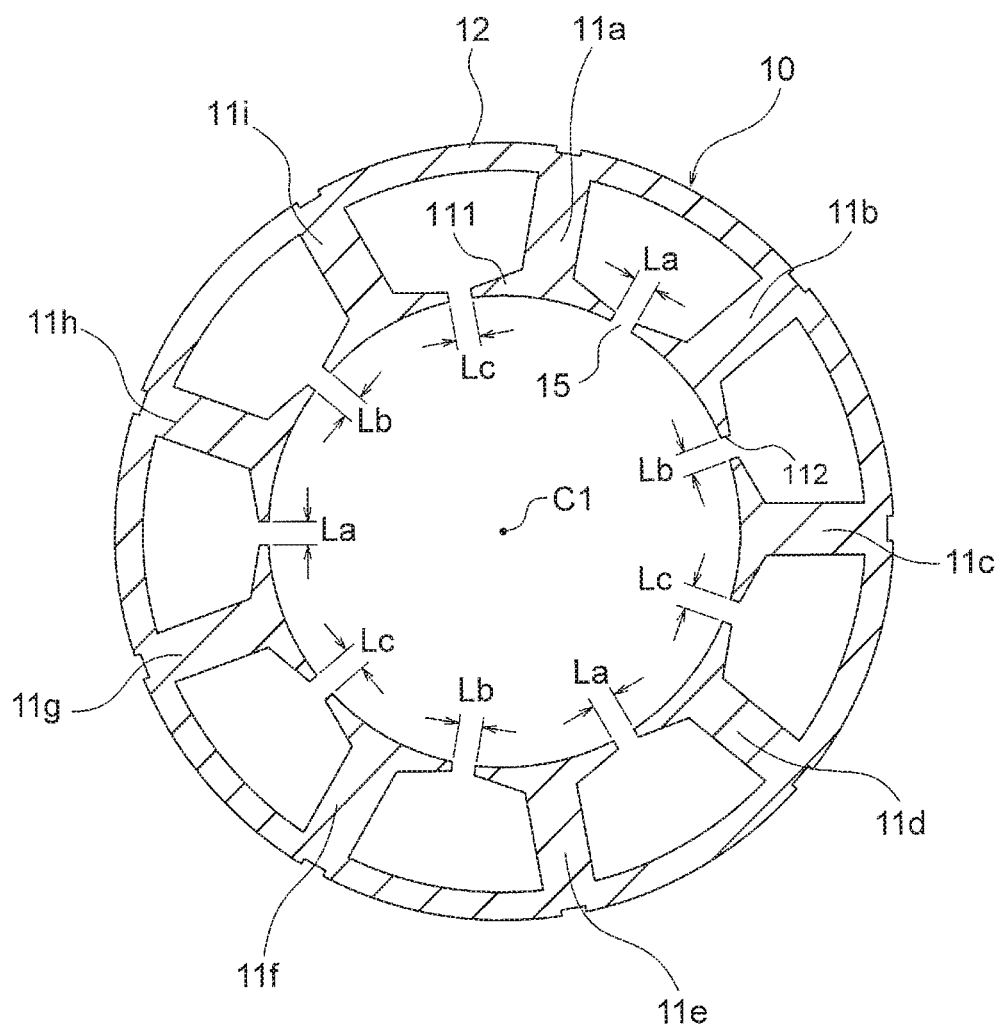
FIG. 12 is a sectional view illustrating a configuration of a stator core according to a modification of the first embodiment.

Next, a modification of the first embodiment will be described. FIG. 12 is a diagram illustrating a shape of a stator core 10 of a motor according to the modification of the first embodiment. In the stator core 10 according to the first embodiment, all of the intervals between the end portions 111 of adjacent teeth 11 are equal. In contrast, in the motor according to the modification, the intervals between end portions 111 of adjacent teeth 11 are not equal but regularly vary. Such a motor is also referred to as an unequal pitch motor.

In FIG. 12, the nine teeth 11 are sequentially expressed as teeth 11a, 11b, 11c, 11d, 11e, 11f, 11g, 11h, and 11i. An interval between the end portions 111 of the teeth 11a and 11b is expressed as La, an interval between the end portions 111 of the teeth 11b and 11c is expressed as Lb, and an interval between the end portions 111 of the teeth 11c and 11d is expressed as Lc. The intervals La, Lb, and Lc are different from each other. In this example, the interval La is the widest.

Further, an interval between the end portions 111 of the teeth 11d and 11e is set equal to the interval La between the end portions 111 of the teeth 11a and 11b, an interval between the end portions 111 of the teeth 11e and 11f is set equal to the interval Lb between the end portions 111 of the teeth 11b and 11c, and an interval between the end portions 111 of the teeth 11f and 11g is set equal to the interval Lc between the end portions 111 of the teeth 11c and 11d. Similarly, an interval between the end portions 111 of the teeth 11g and 11h is set to La, an interval between the end portions 111 of the teeth 11h and 11i is set to Lb, and an interval between the end portions 111 of the teeth 11h and 11a is set to Lc. The intervals La, Lb, and Lc are as described above.

As described in the first embodiment, magnetic flux causing demagnetization of the permanent magnet 5 is magnetic flux flowing from the ends 112 in the circumferential direction of the end portions 111 of the teeth 11 into the permanent magnet 5. Therefore, in portions where the interval between the end portions 111 of the teeth 11 is wide, the magnetic flux acts on a wider area in the permanent magnet 5.

Accordingly, in this modification, the widest interval La of the intervals La, Lb, and Lc between the end portions 111 of the teeth 11a to 11i satisfies the condition of L1 described in the first embodiment. More specifically, $1.00 < L2/La \leq 3.75$ is satisfied. With this configuration, even in a motor in which intervals between the end portions 111 of the teeth 11 are not equal, the effect of suppressing demagnetization of the permanent magnet 5 can be obtained. In this regard, L2 is the width of the groove 55 (FIG. 2) of the permanent magnet 5 in the circumferential direction as described in the first embodiment.

In other words, in this modification, the interval La between the end portion 111 of the tooth 11a (first tooth) and the end portion 111 of the tooth 11b (second tooth) is wider than the interval Lb between the end portion 111 of the tooth 11b and the end portion 111 of the tooth 11c (third tooth) and also wider than the interval Lc between the end portion 111 of the tooth 11c and the end portion 111 of the tooth 11d (fourth tooth), and the widest interval La satisfies $1.00 < L2/La \leq 3.75$.

Although the case where the teeth 11a to 11i have three types of intervals La, Lb, and Lc has been described herein, it is sufficient at least one of the plurality of intervals between the teeth 11 of the stator 1 is different from the other intervals and the widest interval La satisfies $1.00 < L2/La \leq 3.75$.

As described above, in this modification, when the intervals between the end portions 111 of the teeth 11 are not equal, the widest interval La and the width L2 of the groove 55 of the permanent magnet 5 satisfy 1.00<L2/La≤3.75. Therefore, the effect of suppressing demagnetization of the permanent magnet 5 can be obtained even in the unequal pitch motor.

Second Embodiment

Figure 13:
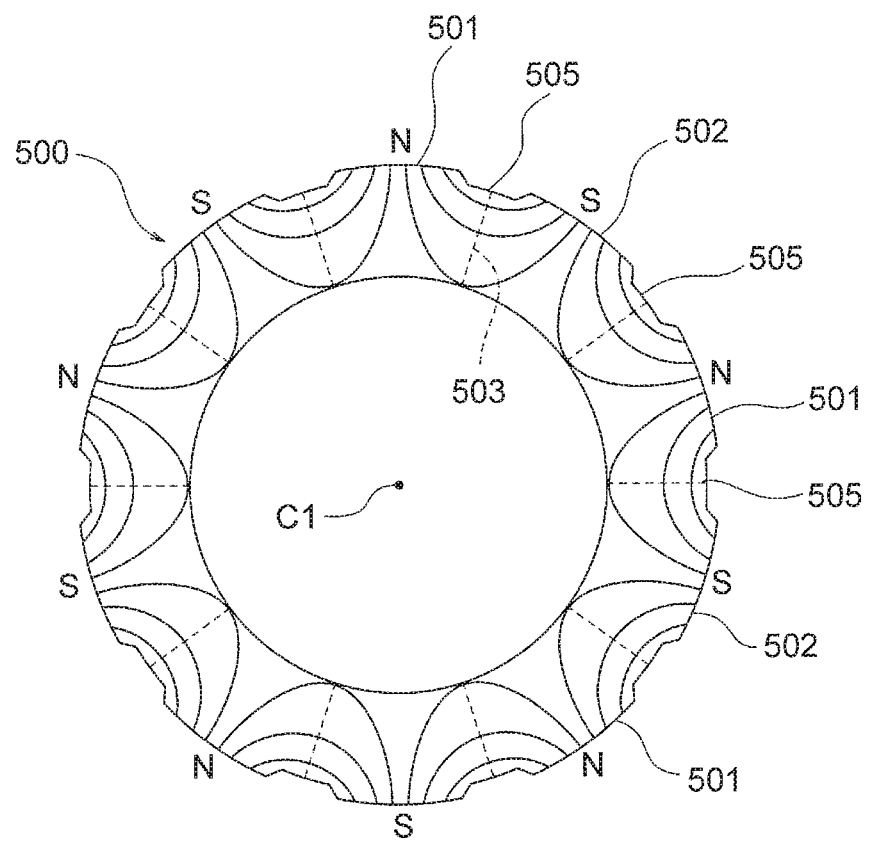
FIG. 13 is a schematic diagram illustrating a configuration of a permanent magnet according to the second embodiment.

Next, the second embodiment of the present invention will be described. FIG. 13 is a diagram illustrating a shape of a permanent magnet 500 of a motor according to the second embodiment. The permanent magnet 5 (FIG. 1) according to the first embodiment has anisotropy in the radial direction (radial anisotropy). In contrast, the permanent magnet 500 according to the second embodiment has anisotropy so as to connect adjacent magnetic poles to each other (polar anisotropy).

The permanent magnet 500 has magnetic poles 501 (first magnetic poles) and magnetic poles 502 (second magnetic poles) on its surface (outer peripheral surface). The magnetic poles 501 and 502 are alternately arranged in the circumferential direction. The magnetic poles 501 serve as north poles, and the magnetic poles 502 serve as south poles. A magnetic path is formed in an arc shape to extend from the magnetic pole 502 (south pole) to the magnetic pole 501 (north pole) in the permanent magnet 500. An inter-pole portion 503 is formed between the magnetic pole 501 and the magnetic pole 502.

When magnetic flux flows from the tooth 11 in an opposite direction with respect to the arc-shaped magnetic path in the permanent magnet 500, the permanent magnet 500 is prone to demagnetization. The surface portion of the inter-pole portion 503 is particularly prone to demagnetization, since the magnetic path therein is short. Therefore, the groove 505 is formed in the inter-pole portion 503 on the surface of the permanent magnet 500 in order to suppress demagnetization.

When the width of the groove 505 is constant in the radial direction (see FIG. 7(A)), the groove 505 intersects the magnetic path in the permanent magnet 500, and thus diamagnetic field becomes larger and the permeance coefficient decreases. If the permeance coefficient decreases, the magnetic flux generated by the permanent magnet 500 decreases, and the motor efficiency is reduced.

Thus, in the second embodiment, the width of the groove 505 decreases inward in the radial direction (see FIG. 7(B)). With this configuration, the shape of the groove 505 is made closer to the shape of the magnetic path in the permanent magnet 500, and thus portions where the groove 505 intersects the magnetic path can be reduced. Therefore, a decrease in magnetic flux generated by the permanent magnet 500 can be suppressed, and the reduction in motor efficiency can be suppressed.

Figure 14:
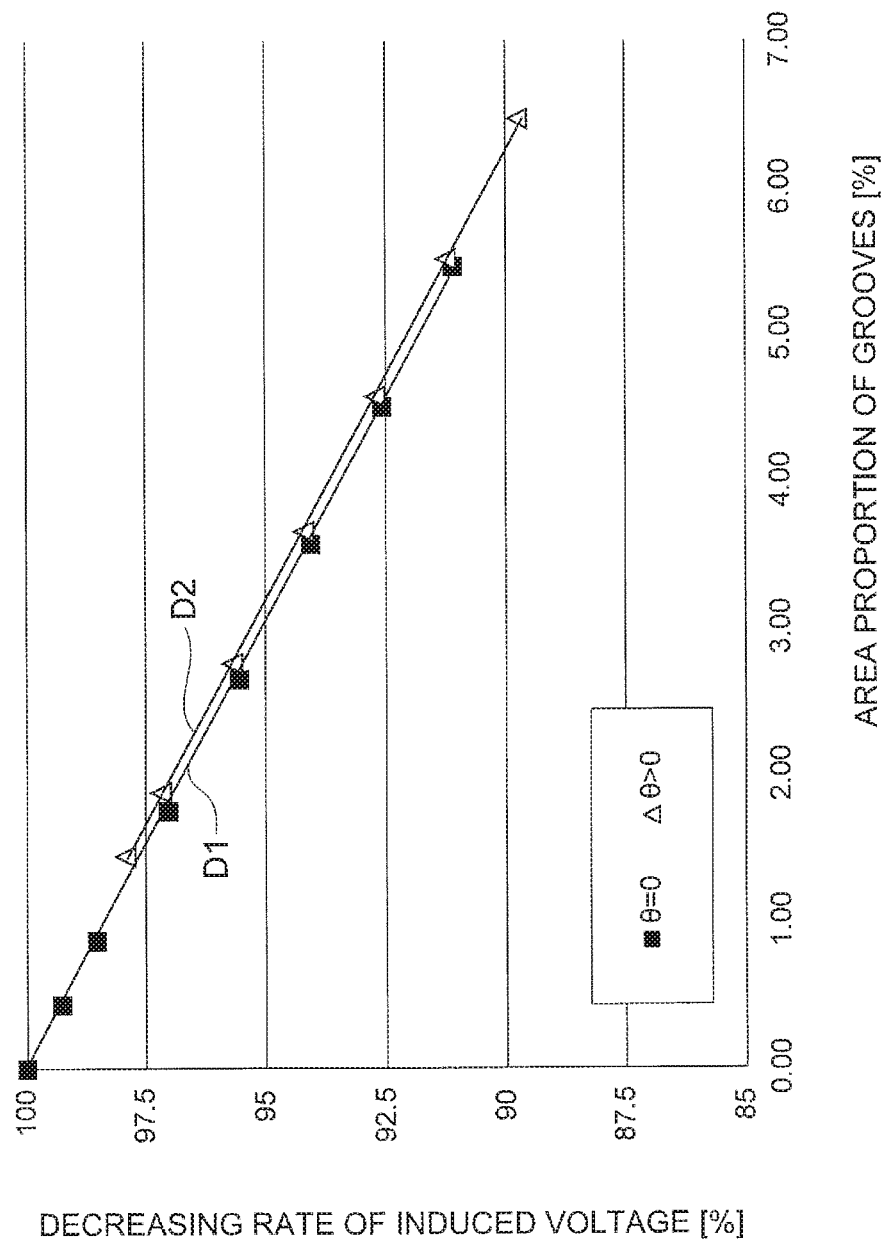
FIG. 14 is a graph illustrating a relationship between an area proportion of grooves and a decreasing rate of induced voltage when a groove shape is changed.

FIG. 14 is a graph illustrating a relationship between the area proportion of the grooves 505 and the decreasing rate of induced voltage, for each of the case (see FIG. 7(A)) where the width of the groove 505 is the same on the outer side and on the inner side in the radial direction and the case (see FIG. 7(B)) where the width of the groove 505 decreases inward in the radial direction, in the permanent magnet 500 having polar anisotropy. In this regard, the angle θ of the end of the groove 505 is larger than zero (in this case, 50°) in the case where the width of the groove 505 decreases inward in the radial direction.

A vertical axis in FIG. 14 represents the decreasing rate of induced voltage. The induced voltage corresponds to a magnetic force of the permanent magnet 500 and accordingly corresponds to a generated torque. The decrease in induced voltage leads to a decrease in torque, that is, a reduction in motor efficiency. The decreasing rate of induced voltage indicates how much the induced voltage decreases based on a reference induced voltage (100%) when no grooves 505 are formed in the permanent magnet 500. A horizontal axis in FIG. 14 represents the area proportion of the grooves 505. A method for calculating the area proportion of the grooves 505 is as described above with reference to FIG. 9.

In FIG. 14, a line segment D1 represents a change in decreasing rate of induced voltage when the width of the groove 505 is the same on the outer side and on the inner side in the radial direction, and a line segment D2 represents a change in decreasing rate of induced voltage when the width of the groove 505 decreases inward in the radial direction. A comparison between the line segment D1 and the line segment D2 shows that the decrease in induced voltage is smaller when the width of the groove 505 decreases inward in the radial direction (line segment D2) even at the same area proportion of the grooves 505.

From this result, it is understood that the configuration in which the width of the groove 505 of the permanent magnet 500 decreases inward in the radial direction does not only suppress demagnetization but also suppresses the decrease in magnetic flux generated by the permanent magnet 500 (that is, the reduction in motor efficiency). As the decrease in magnetic flux generated by the permanent magnet 500 is suppressed, the current required to output a given torque decreases, as described in the first embodiment. Therefore, the magnetic flux flowing from the teeth 11 into the permanent magnet 500 decreases, and demagnetization is further less likely to occur. The motor according to the second embodiment is configured in the same manner as the motor according to the first embodiment, except for the configuration of the permanent magnet 500.

As described above, in this second embodiment, the permanent magnet 500 has polar anisotropy so as to connect adjacent magnetic poles 501 and 502 to each other, and the groove 505 is formed in the inter-pole portion 503 on the surface of the permanent magnet 500. Therefore, demagnetization can be suppressed even in the permanent magnet 500 having polar anisotropy. Further, since the groove 505 of the permanent magnet 500 has a shape in which the width decreases inward in the radial direction, the portions where the permanent magnet 500 intersects the magnetic path are reduced, and the reduction in motor efficiency can thus be suppressed.

Third Embodiment

Figure 15:
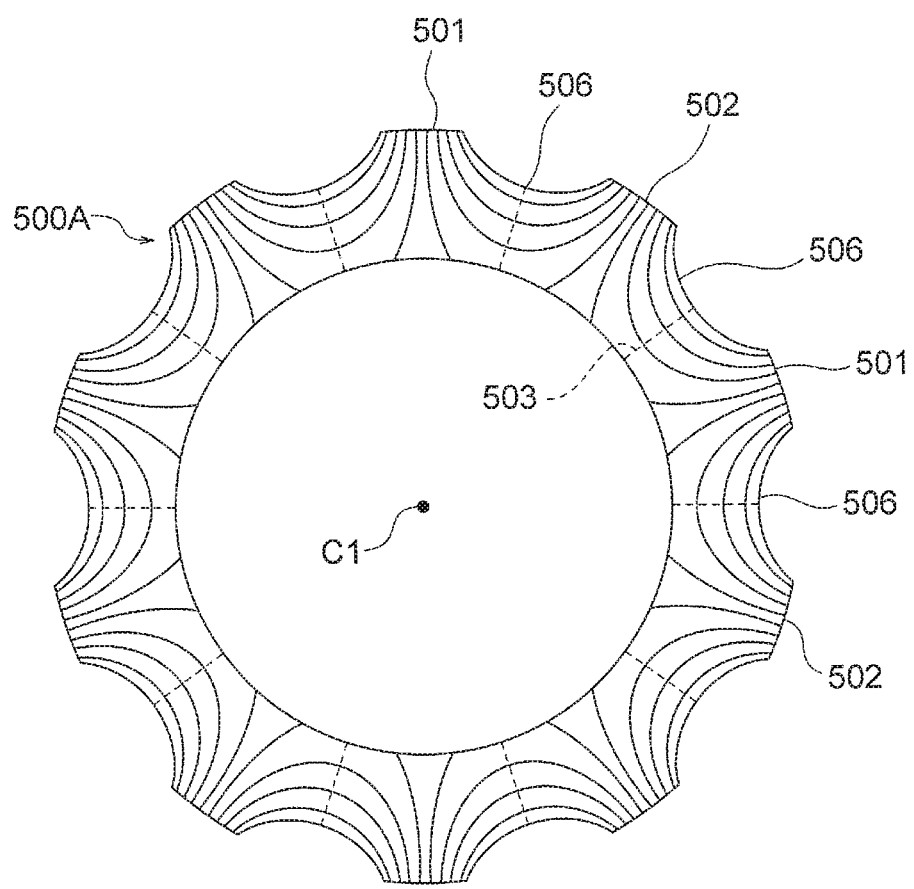
FIG. 15 is a schematic diagram illustrating a configuration of a permanent magnet according to the third embodiment.

Next, the third embodiment of the present invention will be described. FIG. 15 is a diagram illustrating a shape of a permanent magnet 500A of a motor according to the third embodiment. The permanent magnet 500A according to the third embodiment is different from the permanent magnet 500 according to the above described the second embodiment in a shape of a groove 506.

The permanent magnet 500A according to the third embodiment has polar anisotropy, as is the case with the permanent magnet 500 according to the second embodiment. Magnetic poles 501 and 502 are alternately arranged in the circumferential direction on a surface (outer peripheral surface) of the permanent magnet 500A. An inter-pole portion 503 is formed between the magnetic pole 501 and the magnetic pole 502.

Grooves 506 are formed in the inter-pole portions 503 on the surface of the permanent magnet 500A. The groove 506 has a shape in which a width decreases inward in the radial direction (toward an axis line C1). Moreover, in the third embodiment, the groove 506 has a curved shape along a direction of anisotropy of the permanent magnet 500A, that is, a curved shape along the magnetic path between the magnetic poles 501 and 502. An example of the curved shape is an arc shape.

As described in the second embodiment, when the magnetic path in the permanent magnet 500A is blocked by the groove, the permeance coefficient decreases, and thus the motor efficiency is reduced. In the third embodiment, the groove 506 has the curved shape along the direction of anisotropy of the permanent magnet 500A and hence does not block the magnetic path. Therefore, the decrease in magnetic flux generated by the permanent magnet 500A can be suppressed, and the reduction in motor efficiency can be suppressed. As the reduction in magnetic flux generated by the permanent magnet 500A is suppressed, the current required to output a given torque decreases as described in the first embodiment. Therefore, the magnetic flux flowing from the teeth 11 into the permanent magnet 500A decreases, and demagnetization is further less likely to occur. The motor according to the third embodiment is configured in the same manner as the motor according to the first embodiment, except for the configuration of the permanent magnet 500A.

As described above, in this third embodiment, the permanent magnet 500A has polar anisotropy, and the groove 506 formed in the inter-pole portion 503 on the surface of the permanent magnet 500A has the curved shape along the direction of anisotropy of the permanent magnet 500A. Therefore, the groove 506 can be formed so as not to intersect the magnetic path in the permanent magnet 500A, and the reduction in motor efficiency can thus be suppressed.

In this regard, the configuration of the motor in which the intervals between the end portions 111 of the teeth 11 are not equal as described in the modification of the first embodiment may be applied to the second and third embodiments.

Fourth Embodiment

Figure 16:
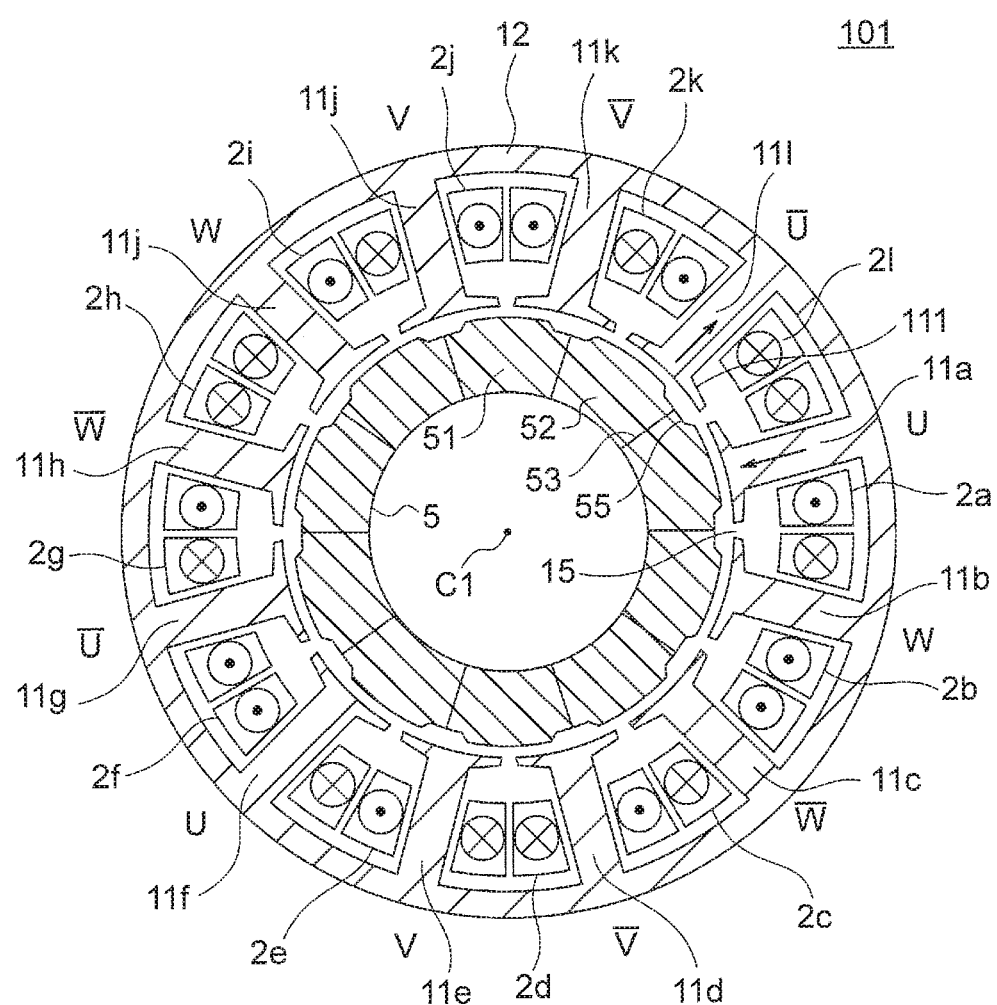
FIG. 16 is a schematic diagram illustrating a configuration of a motor according to the fourth embodiment.

Next, the fourth embodiment of the present invention will be described. FIG. 16 is a diagram illustrating a configuration of a motor according to the fourth embodiment. A motor 101 according to the fourth embodiment is different from the motor 100 according to the first embodiment in the number of teeth 11 and a winding pattern of coils 2.

In this case, a stator 1 includes twelve teeth 11. The twelve teeth 11 are sequentially expressed as teeth 11a, 11b, 11c, 11d, 11e, 11f, 11g, 11h, 11i, 11j, 11k, and 11l. The coils 2 respectively wound around the teeth 11a, 11b, 11c, 11d, 11e, 11f, 11g, 11h, 11i, 11j, 11k, and 11l in concentrated winding are expressed as coils 2a, 2b, 2c, 2d, 2e, 2f, 2g, 2h, 2i, 2j, 2k, and 2l.

A U-phase current flows through the coils 2a and 2f. A W-phase current flows through the coils 2b and 2i. A V-phase current flows through the coils 2e and 2j. A U-bar phase current whose phase is opposite to (that is, shifted by 180° with respect to) the U phase flows through the coils 2g and 2l. A W-bar phase current whose phase is opposite to the W phase flows through the coils 2c and 2h. A V-bar phase current whose phase is opposite to the V phase flows through the coils 2d and 2k.

In this winding pattern, the U-phase current flows through the coil 2a wound around the tooth 11a, and the U-bar phase current flows through the coil 2l wound around the adjacent tooth 11l. The W-phase current flows through the coil 2b wound around the tooth 11b, and the W-bar phase current flows through the coil 2c wound around the adjacent tooth 11c. The V-bar phase current flows through the coil 2d wound around the tooth 11d, and the V-phase current flows through the coil 2e wound around the tooth 11e.

Similarly, the U-phase current flows through the coil 2f wound around the tooth 11f, and the U-bar phase current flows through the coil 2g wound around the adjacent tooth 11g. The W-bar phase current flows through the coil 2h wound around the tooth 11h, and the W-phase current flows through the coil 2i wound around the adjacent tooth 11i. The V-phase current flows through the coil 2j wound around the tooth 11j, and the V-bar phase current flows through the coil 2k wound around the adjacent tooth 11k. In this manner, in the second embodiment, currents whose phases are opposite to each other flow through the coils 2 wound around the teeth 11 adjacent to each other.

If the U-phase current flows through the coil 2a wound around the tooth 11a, and the V-phase current and the W-phase current respectively flow through the coils 2l and 2b wound around the teeth 11l and 11b adjacent to the tooth 11a, a phase difference between the current flowing through each of the coils 2l and 2b and the current flowing through the coil 2a is 120°, and thus magnetic flux uniformly flows into the teeth 11l and 11b from the tooth 11a.

In contrast, in the fourth embodiment, the currents whose phases are opposite to each other flow through the coil 2a (first coil) wound around the tooth 11a (first tooth) and the coil 2l (second coil) wound around the adjacent tooth 11l (second tooth), and thus most of magnetic flux generated in the tooth 11a flows into the tooth 11l. Therefore, the amount of magnetic flux flowing between the end portion 111 of the tooth 11a and the end portion 111 of the tooth 11l increases, and the amount of magnetic flux flowing through the permanent magnet 5 thus increases. In other words, a stronger magnetic field acts on the permanent magnet 5 from the teeth 11a and 11l.

However, as described in the first embodiment, since the grooves 55 are formed in the inter-pole portions 53 of the permanent magnet 5, demagnetization by the magnetic flux from the end portions 111 of the teeth 11a and 11l can be suppressed. The same applies to the magnetic flux from the other teeth 11b to 11k. Thus, suppressing demagnetization by forming the grooves 55 in the inter-pole portions 53 of the permanent magnet 5 is particularly useful in the motor having the winding pattern as illustrated in FIG. 16.

In the example illustrated in FIG. 16, the current flowing through the coil 2 wound around every tooth 11 is of an opposite phase to the current flowing through the coil 2 wound around its adjacent tooth 11, but this embodiment is not limited to such a configuration. It is sufficient that currents of mutually opposite phases flow through the coils 2 wound around at least two adjacent teeth 11 among a plurality of teeth 11. The motor according to the fourth embodiment is configured in the same manner as the motor according to the first embodiment, except for the above described configuration.

As described above, in the fourth embodiment of the present invention, in the motor in which currents of mutually opposite phases flow through the coils 2 wound around the adjacent teeth 11, the grooves 55 are formed in the inter-pole portions 53 on the surface of the permanent magnet 5. Therefore, even when a large amount of magnetic flux flows from the end portions 111 of the teeth 11 into the permanent magnet 5, demagnetization of the permanent magnet 5 can be suppressed.

The configuration of the motor in which the intervals between the end portions 111 of the teeth 11 are not equal as described in the modification of the first embodiment may be applied to the fourth embodiment, and the polar anisotropy and the groove shape of the permanent magnet as described in the second and third embodiments may be applied to the fourth embodiment.

Fifth Embodiment

Figure 17:
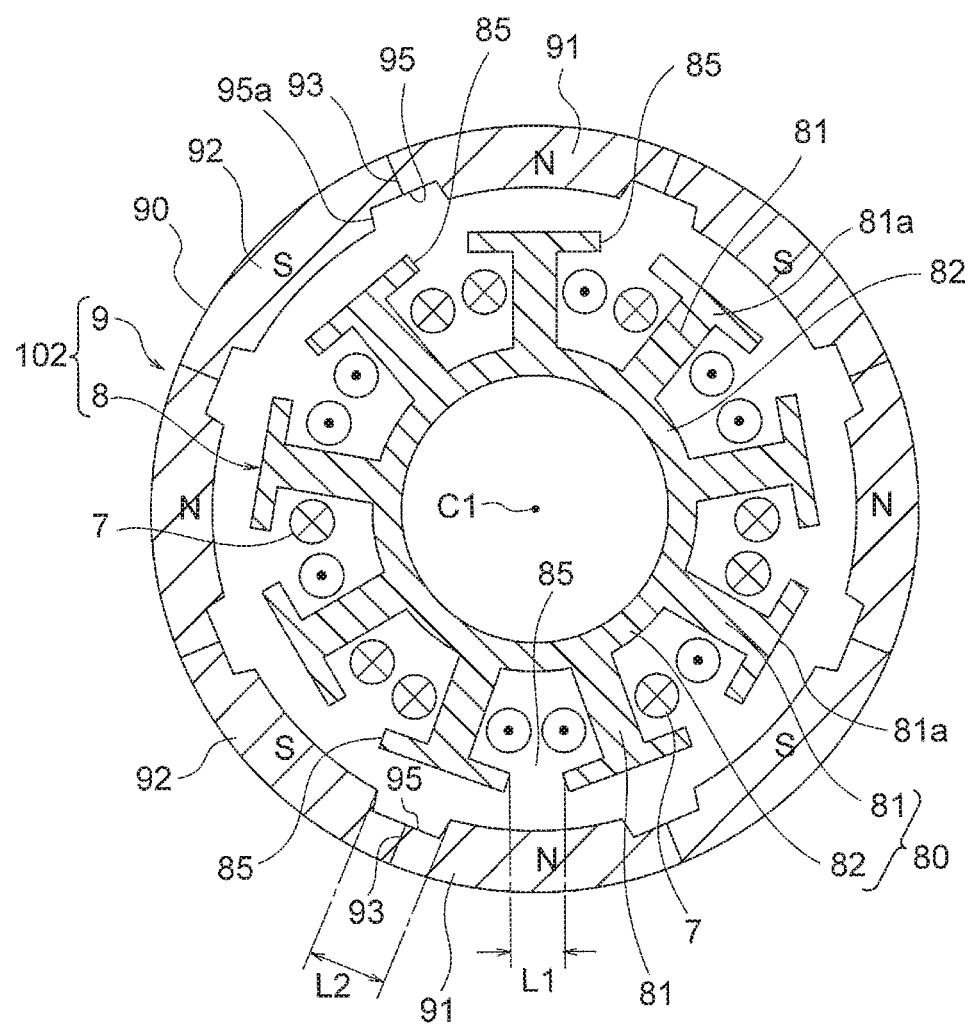
FIG. 17 is a schematic diagram illustrating a configuration of a motor according to the fifth embodiment.

Next, the fifth embodiment of the present invention will be described. FIG. 17 is a diagram illustrating a configuration of a motor according to the fifth embodiment. A motor 102 according to the fifth embodiment is different from the motor 100 according to the first embodiment in that the motor 102 has an outer rotor configuration in which a rotor 9 is disposed outside a stator 8.

The stator 8 includes a stator core 80 made of, for example, a stacked body of electromagnetic steel sheets, and coils 7 wound around the stator core 80. The stator core 80 includes a yoke 82 having an annular shape about an axis line C1, and a plurality of teeth 81 extending outward in the radial direction from the yoke 82. The teeth 81 are formed at equal intervals in the circumferential direction about the axis line C1.

The tooth 81 includes an end portion 81a formed at its end on an outer side in the radial direction, and the end portion 81a has a width (a dimension in the circumferential direction) wider than those of the other portions of the tooth 81. The end portion 81a includes ends 85 at both ends in the circumferential direction. An interval between the end portions 81a of the adjacent teeth 81 (that is, an interval between the ends 85 facing each other) is expressed as an interval L1.

The rotor 9 includes a permanent magnet 90 annularly disposed around the stator 8. The permanent magnet 90 has magnetic poles 91 and 92 alternately arranged in the circumferential direction about the axis line C1. In this case, the permanent magnet 90 has eight poles, that is, four magnetic poles 91 and four magnetic poles 92, but the number of poles is not limited to eight. The material of the permanent magnet 90 is as described in the first embodiment. The rotor 9 is mounted on a shaft through a hub (not illustrated), and the axis line C1 is a center of rotation of the shaft.

An inter-pole portion 93 is formed between the magnetic poles 91 and 92 of the permanent magnet 90. Grooves 95 are formed on an inner peripheral surface (a surface) of the permanent magnet 90 and in the inter-pole portions 93. The grooves 95 extend in the axial direction. A width of the groove 95 in the circumferential direction is expressed as a width L2.

Magnetic flux generated by a current flowing through the coil 7 wound around the tooth 81 passes through a surface portion of the rotor 9 facing the end portion 81a of the tooth 81 and flows into the adjacent tooth 81. As the interval between the end portions 81a of the adjacent teeth 81 decreases, an amount of magnetic flux flowing through the permanent magnet 90 increases. The inter-pole portions 93 between the magnetic poles 91 and 92 are particularly prone to demagnetization.

In the fifth embodiment, the grooves 95 are formed on the surface (inner peripheral surface) of the permanent magnet 90 and in the inter-pole portions 93 (that is, portions most prone to demagnetization in the permanent magnet 90), and therefore demagnetization of the permanent magnet 90 is suppressed.

The interval L1 between the end portions 81a of the teeth 81 and the width L2 of the groove 95 of the permanent magnet 90 satisfy $1.00 < L2/L1 \leq 3.75$. In other words, the width L2 of the groove 95 is larger than the interval L1 between the end portions 81a of the adjacent teeth 81, and is smaller than or equal to 3.75 times the interval L1. Accordingly, the effect of suppressing demagnetization of the permanent magnet 90 can be enhanced as described in the first embodiment.

Further, the groove 95 has a shape in which a width decreases outward in the radial direction (that is, decreases as a distance from the stator 8 increases). This makes it possible to suppress demagnetization of the permanent magnet 90, to suppress the reduction in area proportion of the grooves 95, and thus to suppress the reduction in motor efficiency.

In this fifth embodiment, it is desirable that an area S1 of the permanent magnet 90, and an area S0 of an annular portion surrounded by a circle touching an outer periphery of the permanent magnet 90 and a circle touching an inner periphery of the permanent magnet 90 satisfy $(S0-S1)/S1 \times 100 > 4.20\%$, and an angle θ of a groove side portion 95a at an end of the groove 95 in the circumferential direction is 30° or larger. This can enhance the effect of suppressing demagnetization of the permanent magnet 90 as described in the first embodiment.

Further, a length W1 in the radial direction of the end 85 of the tooth 81 in the circumferential direction, a length T1 of the tooth 81 in the axial direction, and magnetic flux Φ generated in the tooth 81 desirably satisfy $\Phi/(W1 \times T1) > 1.6$ (T). This makes it possible to reduce magnetic flux flowing from the teeth 81 into the permanent magnet 90 and thus to enhance the effect of suppressing demagnetization as described in the first embodiment.

As described above, in the fifth embodiment of the present invention, the groove 95 is formed in the inter-pole portion 93 on the surface (inner peripheral surface) of the permanent magnet 90, and the width L2 of the groove 95 and the interval L1 between the end portions 81a of the adjacent teeth 81 satisfy $1.00 < L2/L1 \leq 3.75$. Therefore, demagnetization of the permanent magnet 90 can be effectively suppressed.

The configuration of the motor in which the intervals between the end portions 111 of the teeth 11 are not equal as described in the modification of the first embodiment may be applied to the fifth embodiment, and the polar anisotropy and the groove shape of the permanent magnet as described in the second and third embodiments may be applied to the fifth embodiment. The winding pattern as described in the fourth embodiment may be applied to the fifth embodiment.

(Air Conditioning Apparatus)

Figure 18:
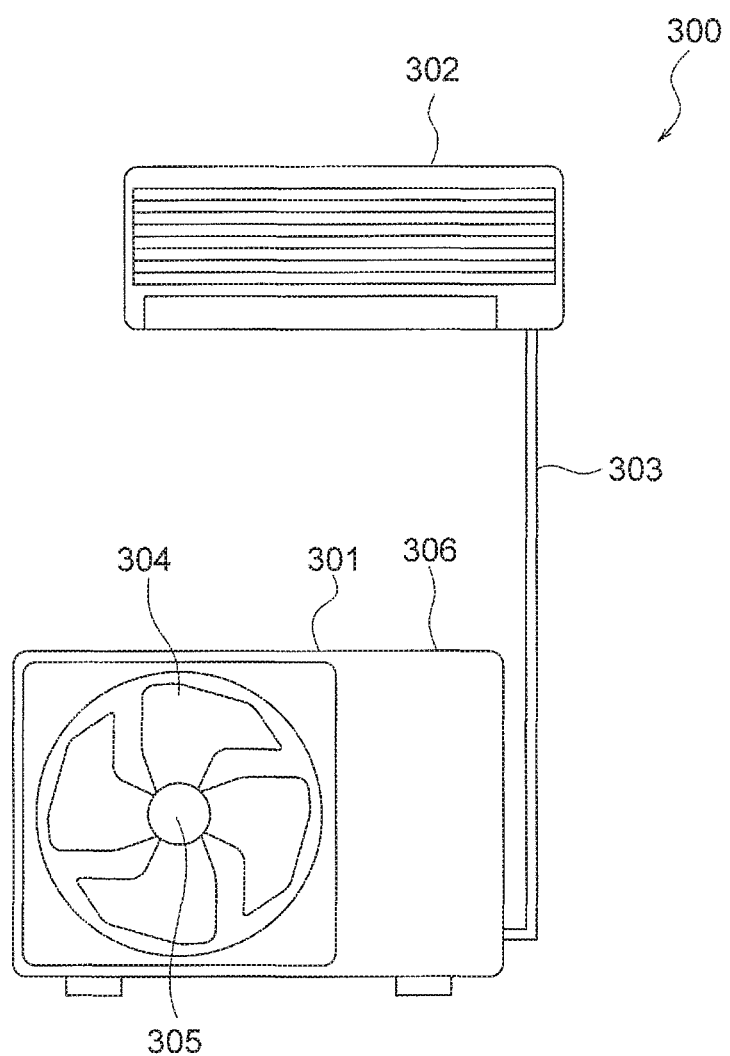
FIG. 18 is a schematic diagram illustrating a configuration of an air conditioning apparatus to which the motor in each of the embodiments is applied.

Next, an air conditioning apparatus to which the motor according to each of the above described embodiments is applied will be described. FIG. 18 is a diagram illustrating a configuration of an air conditioning apparatus 300 using the motor 100 according to the first embodiment. In place of the motor 100 according to the first embodiment, the motor according to the modification or any of the second to fifth embodiments may be used. The air conditioning apparatus 300 includes an outdoor unit 301, an indoor unit 302, and a refrigerant pipe 303 connecting these units to each other. The outdoor unit 301 includes an outdoor fan 305 as a fan.

FIG. 19(A) is a front view illustrating a configuration of the outdoor unit 301. FIG. 19(B) is a sectional view taken along a line 19B-19B illustrated in FIG. 19(A). The outdoor unit 301 includes a housing 306, and a frame 307 fixed in the housing 306. The motor 100 serving as a driving source for the outdoor fan 305 is fixed to the frame 307. An impeller 304 is mounted on the shaft 40 of the motor 100 through a hub 308.

The motor 100, the hub 308, and the impeller 304 constitute the outdoor fan 305. FIG. 19(A) also illustrates a compressor 309 which compresses refrigerant. When the rotor 4 (FIG. 1) of the motor 100 rotates, the impeller 304 mounted on the shaft 40 rotates and blows air out of the room. When the air conditioning apparatus 300 operates in a cooling mode, the refrigerant compressed by the compressor 309 is condensed in a condenser (not illustrated), and heat dissipated at the time of condensation is released outside the room by the air blown by the outdoor fan 305.

The motor 100 according to the above described the first embodiment suppresses demagnetization of the permanent magnet 5 and improves motor efficiency. Hence, the use of the motor 100 as a power source for the outdoor fan 305 can improve operating efficiency of the air conditioning apparatus 300 for a long time period and thus reduce energy consumption. The same can be said when the motor according to any other embodiment is used as the power source for the outdoor fan 305.

Although the motor described in each of the embodiments is used herein for the outdoor fan 305 of the outdoor unit 301, the motor in each of the embodiments may also be used for the fan of the indoor unit 302.

While desirable embodiments of the present invention have been described in detail above, the present invention is not limited thereto, and various improvements or modifications may be made without departing from the gist of the present invention.

What is claimed is:

1. A motor comprising:
    a stator having a yoke having an annular shape about an axis line, and a first tooth and a second tooth extending from the yoke toward an inner peripheral side or an outer peripheral side; and
    a rotor rotatable about the axis line, the rotor having a permanent magnet on a surface facing the stator,
    wherein each of the first tooth and the second tooth has an end portion facing the permanent magnet;
    wherein the permanent magnet has a first magnetic pole and a second magnetic pole adjacent to each other in a circumferential direction about the axis line, and a groove formed in an inter-pole portion between the first magnetic pole and the second magnetic pole;
    wherein the groove has a groove side portion at an end in the circumferential direction;
    wherein an interval L1 in the circumferential direction between the end portion of the first tooth and the end portion of the second tooth, and a width L2 of the groove in the circumferential direction satisfy $1.00 < L2/L1 \leq 3.75$;
    wherein in a plane perpendicular to the axis line, an angle of the groove side portion with respect to a straight line passing through the axis line and a central point of the groove in the circumferential direction is larger than or equal to 30°; and
    wherein an area S1 of the permanent magnet in the plane perpendicular to the axis line, and an area S0 of an annular portion surrounded by a circle touching an outer periphery of the permanent magnet and a circle touching an inner periphery of the permanent magnet satisfy:

$(S0-S1)/S1 \times 100 > 4.20\%$.

2. The motor according to claim 1, wherein the groove has a shape in which a width in the circumferential direction decreases as a distance from the stator increases.

3. The motor according to claim 2, wherein the permanent magnet has polar anisotropy so as to connect the first magnetic pole and the second magnetic pole to each other.

4. The motor according to claim 3, wherein the groove has a curved shape along a direction of anisotropy of the permanent magnet in a plane perpendicular to the axis line.

5. The motor according to claim 1, wherein the permanent magnet has anisotropy in a radial direction about the axis line.

6. The motor according to claim 1, wherein the stator has a third tooth on a side opposite to the second tooth with respect to the first tooth, and
    wherein the interval L1 between the end portion of the first tooth and the end portion of the second tooth is wider than an interval between the end portion of the second tooth and an end portion of the third tooth.

7. The motor according to claim 1, wherein the groove has a groove bottom extending in the circumferential direction, and two groove side portions formed on both sides of the groove bottom in the circumferential direction.

8. The motor according to claim 1, wherein a length W1 in a radial direction of an end of the end portion of the first tooth in the circumferential direction, a length T1 of the first tooth in a direction of the axis line, and magnetic flux $\Phi$ generated in the first tooth by a current flowing through a coil wound around the first tooth satisfy:

$\Phi/(W1 \times T1) > 1.6(T)$.

9. The motor according to claim 1, wherein the permanent magnet is formed of a bonded magnet.

10. The motor according to claim 1, wherein a first coil is wound around the first tooth, and a second coil is wound around the second tooth, and
    wherein currents whose phases are opposite to each other flow through the first coil and the second coil.

11. The motor according to claim 1, wherein the stator is disposed on an outer peripheral side of the rotor;
    wherein the first tooth and the second tooth extend from the yoke toward an inner peripheral side; and
    wherein the groove is formed on an outer peripheral surface of the permanent magnet.

12. The motor according to claim 11, further comprising a mold resin covering an outer side of the stator,
    wherein the rotor has a shaft, and a resin part which is fixed to the shaft and holds the permanent magnet.

13. The motor according to claim 1, wherein the stator is disposed on an inner peripheral side of the rotor;
    wherein the first tooth and the second tooth extend from the yoke toward an outer peripheral side; and
    wherein the groove is formed on an inner peripheral surface of the permanent magnet.

14. An air conditioning apparatus comprising an outdoor unit, an indoor unit, and a refrigerant pipe connecting the outdoor unit and the indoor unit,
    at least one of the outdoor unit and the indoor unit having a fan,
    the fan having a blade and a motor rotating the blade, the motor comprising:
    a stator having a yoke having an annular shape about an axis line, and a first tooth and a second tooth extending from the yoke toward an inner peripheral side or an outer peripheral side; and
    a rotor rotatable about the axis line, the rotor having a permanent magnet on a surface facing the stator, wherein each of the first tooth and the second tooth has an end portion facing the permanent magnet;

wherein the permanent magnet has a first magnetic pole and a second magnetic pole adjacent to each other in a circumferential direction about the axis line, and a groove formed in an inter-pole portion between the first magnetic pole and the second magnetic pole;

wherein the groove has a groove side portion at an end in the circumferential direction;

wherein an interval L1 in the circumferential direction between the end portion of the first tooth and the end portion of the second tooth, and a width L2 of the groove in the circumferential direction satisfy $1.00 < L2/L1 \leq 3.75$;

wherein in a plane perpendicular to the axis line, an angle of the groove side portion with respect to a straight line passing through the axis line and a central point of the groove in the circumferential direction is larger than or equal to 30°; and wherein an area S1 of the permanent magnet in the plane perpendicular to the axis line, and an area S0 of an annular portion surrounded by a circle touching an outer periphery of the permanent magnet and a circle touching an inner periphery of the permanent magnet satisfy:

$(S0-S1)/S1 \times 100 > 4.20\%$.

* * * * *